United States Patent
Nishiguchi et al.

(10) Patent No.: US 6,535,159 B1
(45) Date of Patent: Mar. 18, 2003

(54) IMMERSION OBJECT DETECTION SYSTEM AND METHOD

(75) Inventors: Tadao Nishiguchi, Kyoto (JP); Hiroshi Shimamoto, Kyoto (JP); Ryuji Kawamoto, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/996,594

(22) Filed: May 21, 2002

(30) Foreign Application Priority Data

Dec. 1, 2000 (JP) ...................................... 2000-367634
Nov. 26, 2001 (JP) ...................................... 2001-359840

(51) Int. Cl.$^7$ ............................................. G01S 13/00
(52) U.S. Cl. ........................... 342/27; 342/28; 342/107; 340/552
(58) Field of Search .............................. 342/27, 28, 56, 342/58, 59, 90, 107, 109, 113, 114, 115, 192, 196; 340/541, 552, 565, 567

(56) References Cited

U.S. PATENT DOCUMENTS

| | | | | |
|---|---|---|---|---|
| 3,801,978 A | * | 4/1974 | Gershberg et al. | 340/516 |
| 4,051,472 A | * | 9/1977 | Albanese et al. | 342/28 |
| 4,124,848 A | * | 11/1978 | Clark et al. | 340/524 |
| 4,210,399 A | * | 7/1980 | Jain | 356/28.5 |
| 5,966,090 A | * | 10/1999 | McEwan | 342/27 |
| 6,400,307 B2 | * | 6/2002 | Fullerton et al. | 342/28 |
| 2001/0035837 A1 | * | 11/2001 | Fullerton et al. | 342/28 |

FOREIGN PATENT DOCUMENTS

| | | |
|---|---|---|
| JP | 09-274839 | 10/1997 |
| JP | 2000-266861 | 9/2000 |
| JP | 2001-325690 | 11/2001 |

OTHER PUBLICATIONS

"New microwave sensors for intrusion detection systems", Martinez, F.P.; Galeano, F.C., Security Technology, 1999. Proceedings. IEEE 33rd Annual 1999 International Carnahan, Conference on, 1999, pp.: 49–53.*

* cited by examiner

Primary Examiner—John B. Sotomayor
(74) Attorney, Agent, or Firm—Dickstein Shapiro Morin & Oshinsky, LLP

(57) ABSTRACT

To provide an immersion object detection system capable of detecting an immersion object within a detection target area and specifying a position thereof irrespective of a short distance/long distance.

A millimeter wave is irradiated to a detection area from a millimeter-wave RF unit through an antenna unit, and the reflected wave is detected. In the case that an immersion object exists in a short-distance area from a radar unit, the directly reflected waves from the immersion object is analyzed, thereby specifying the position of the immersion object, and in the case that the immersion object exists in a long-distance area from the radar unit, the position of the immersion object is specified in accordance with the position of the reflection member which cannot detect among the group of reflection members placed within the detection area.

41 Claims, 22 Drawing Sheets

Frequency (parallel to distance)

FIG. 5
(a)
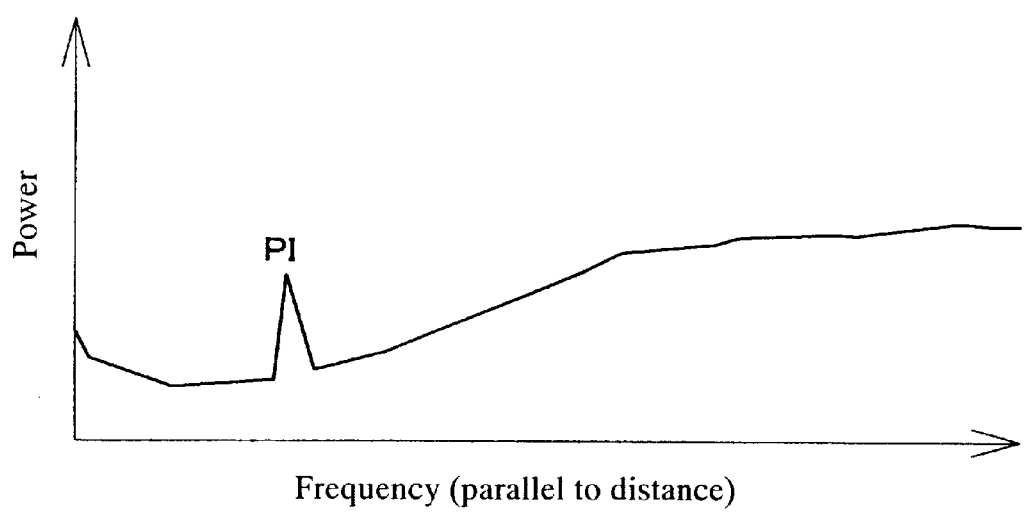
(b)
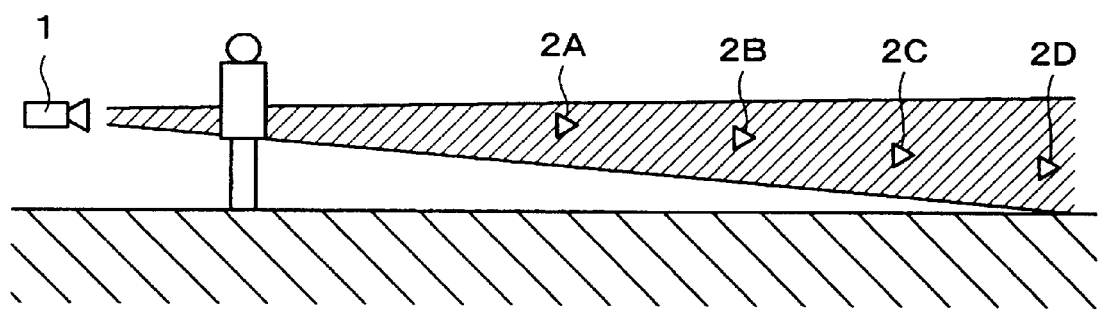

FIG. 6
(a)
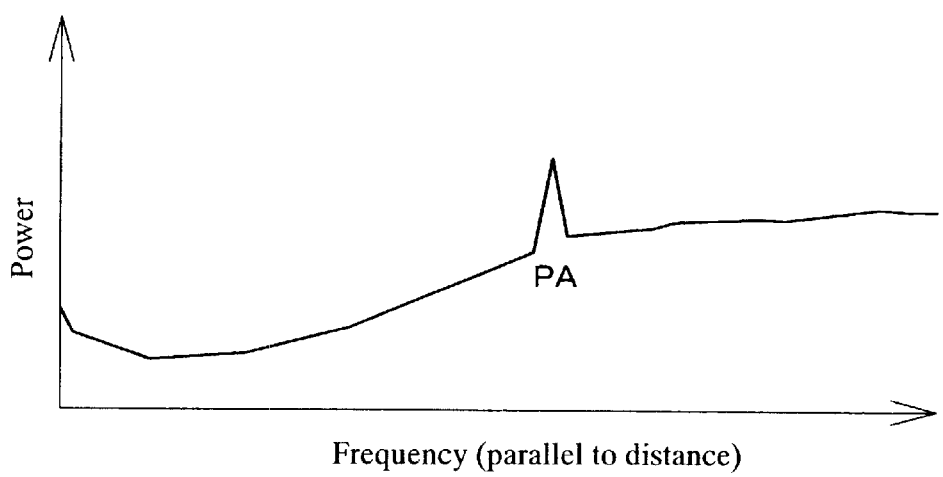
Frequency (parallel to distance)
(b)
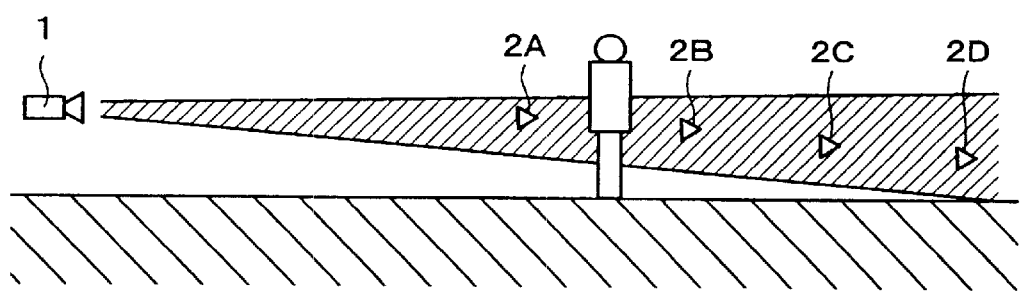

FIG. 10
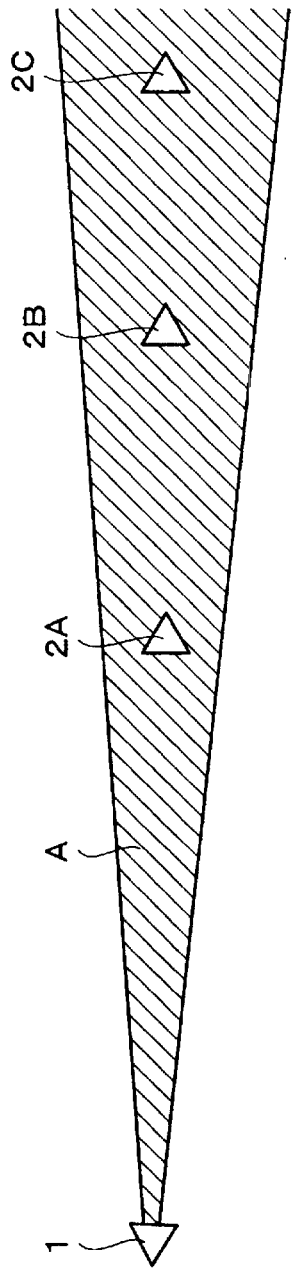
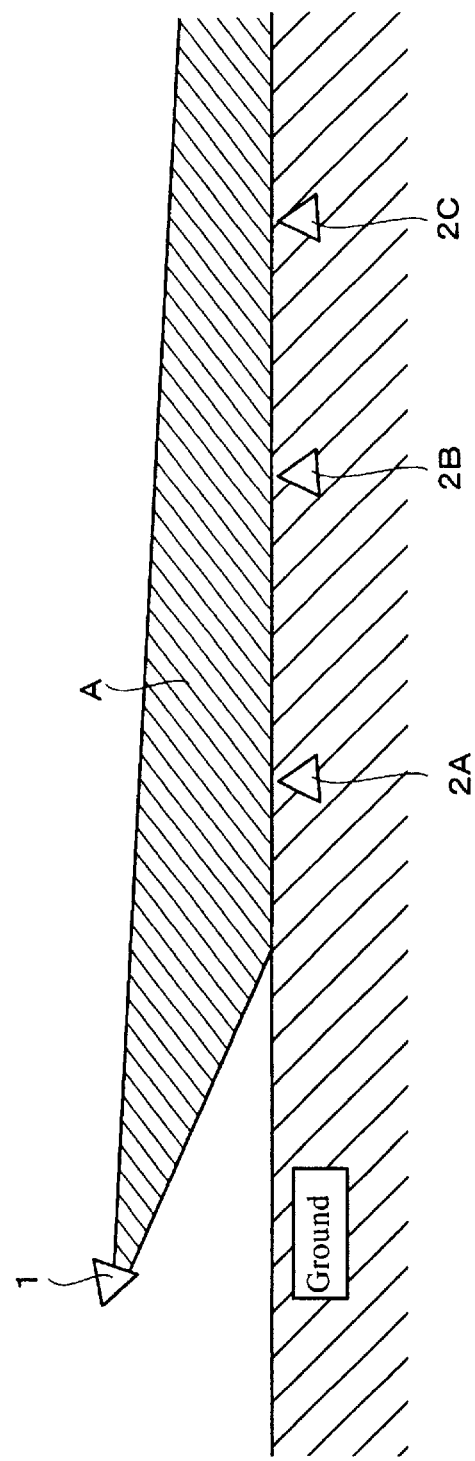

FIG. 11
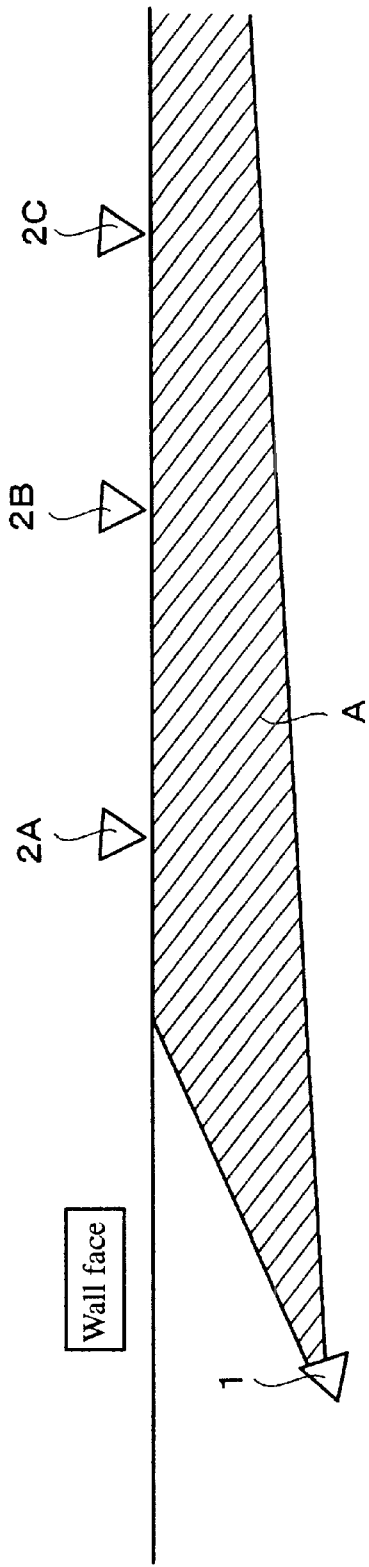
(a)
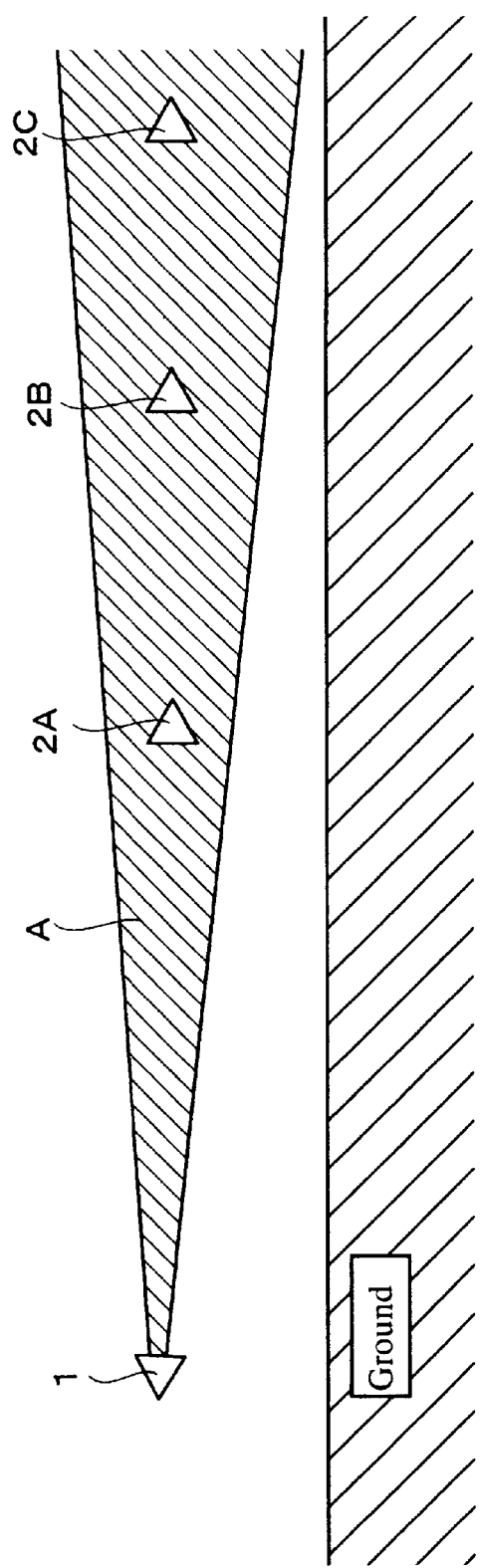
(b)

FIG. 12
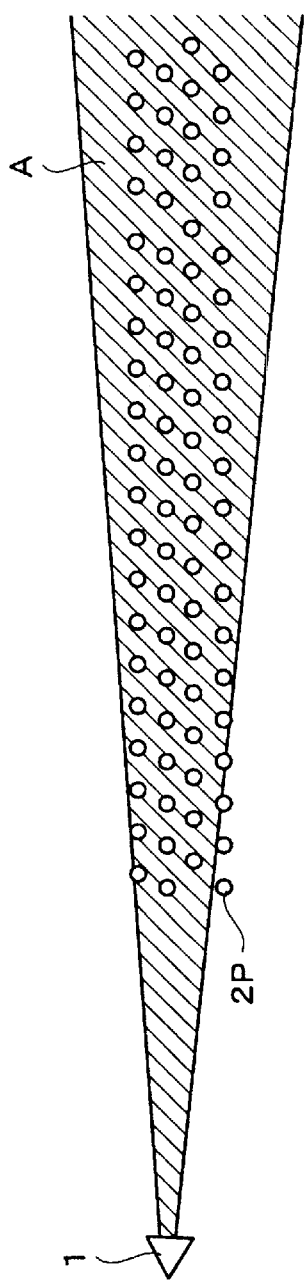
(a)
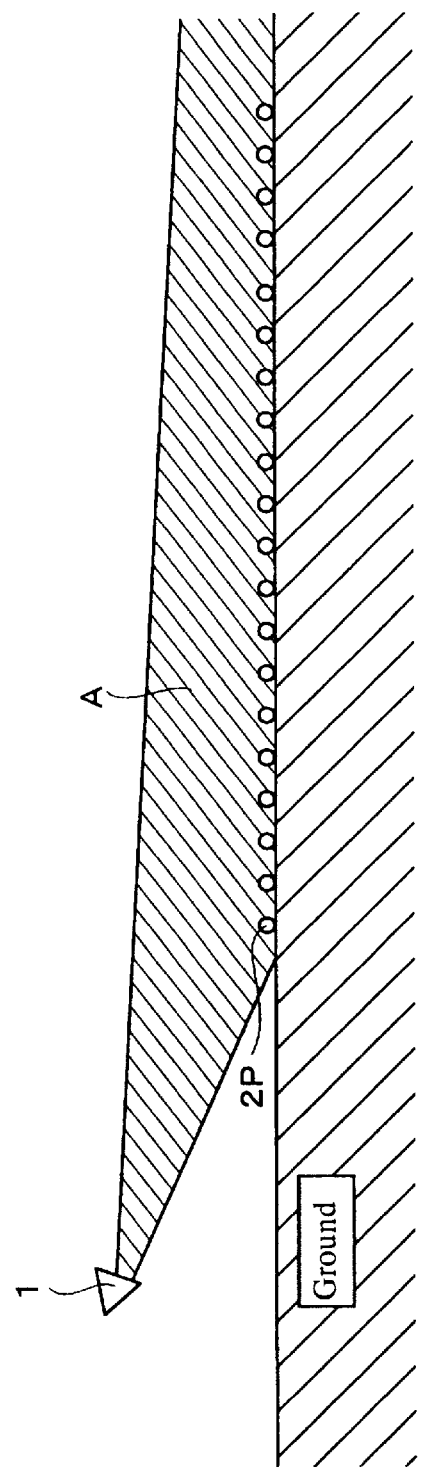
(b)

FIG. 13
(a)
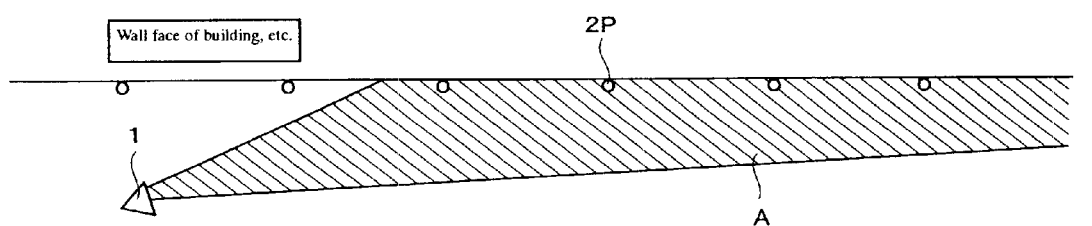
(b)
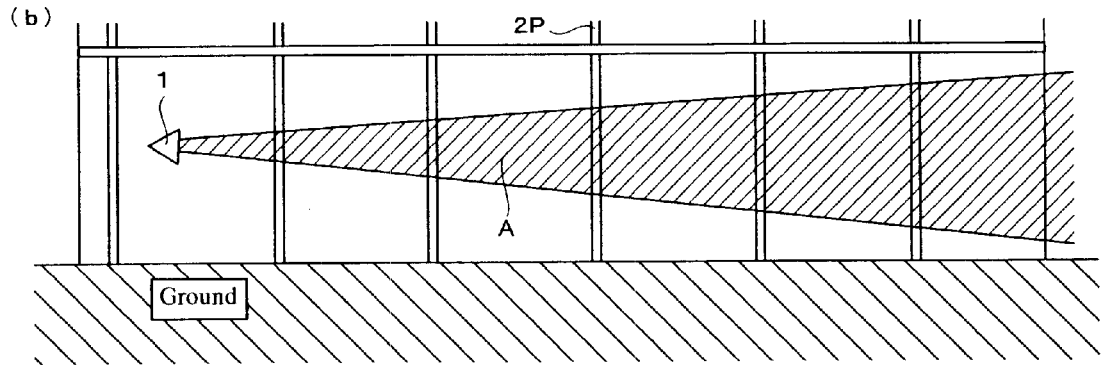

FIG. 14
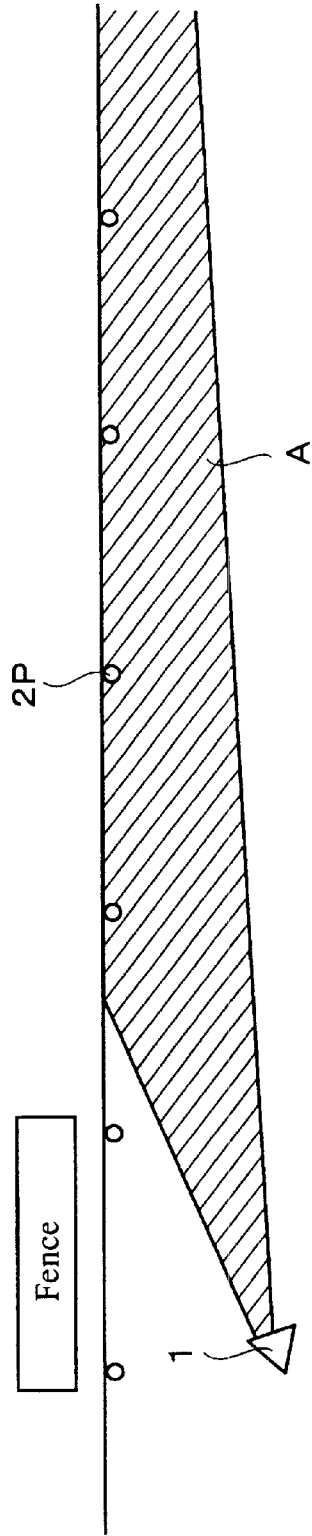
(a)
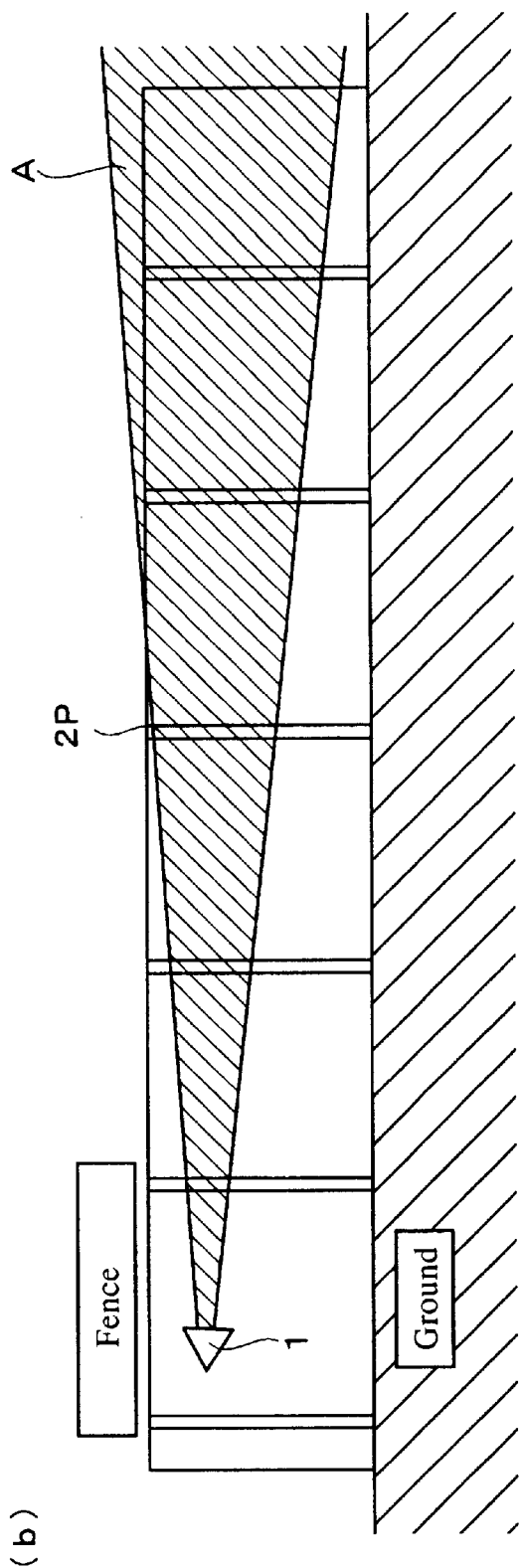
(b)

FIG. 16
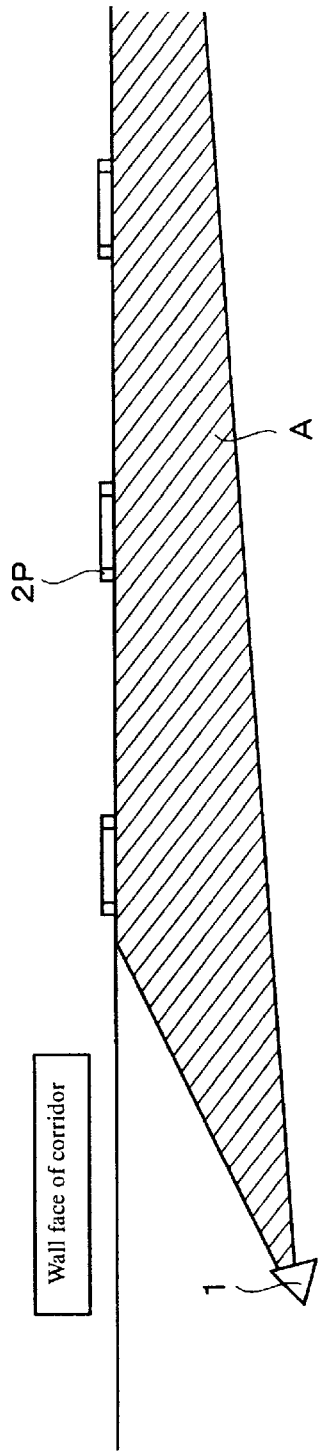
(a)
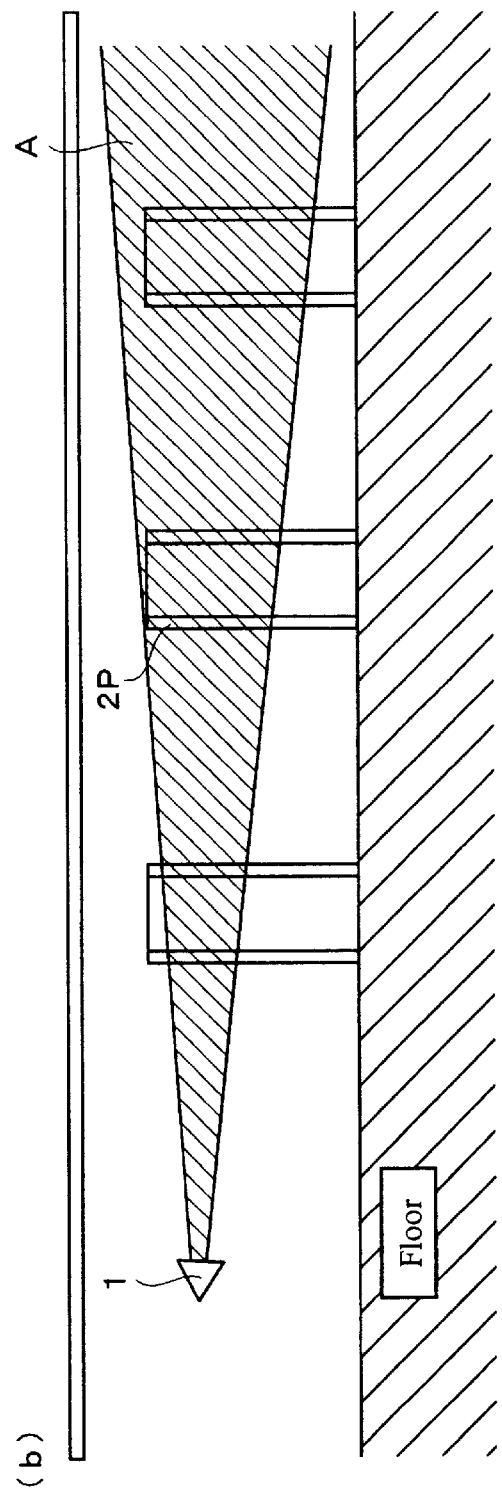
(b)

FIG. 18
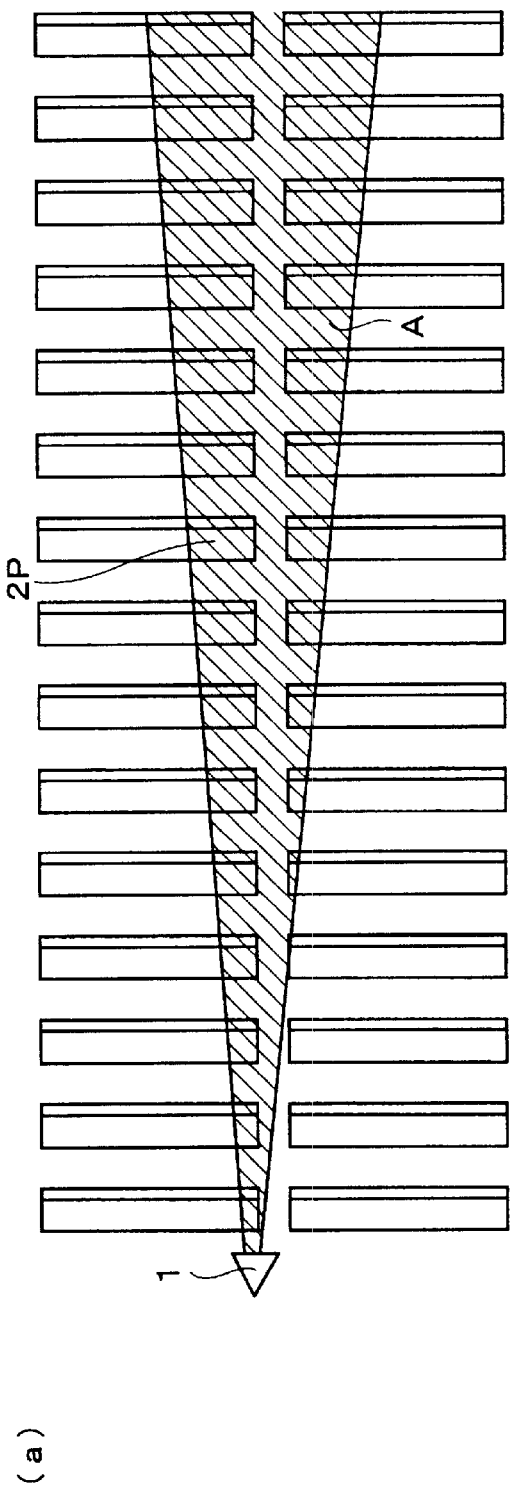
(a)
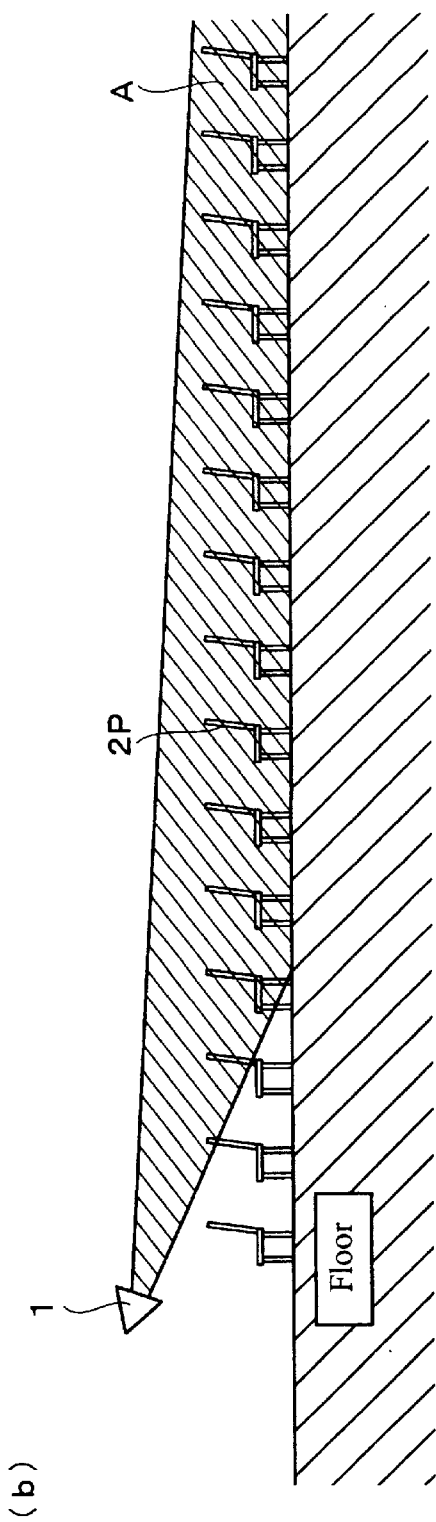
(b)

FIG. 20
(a)
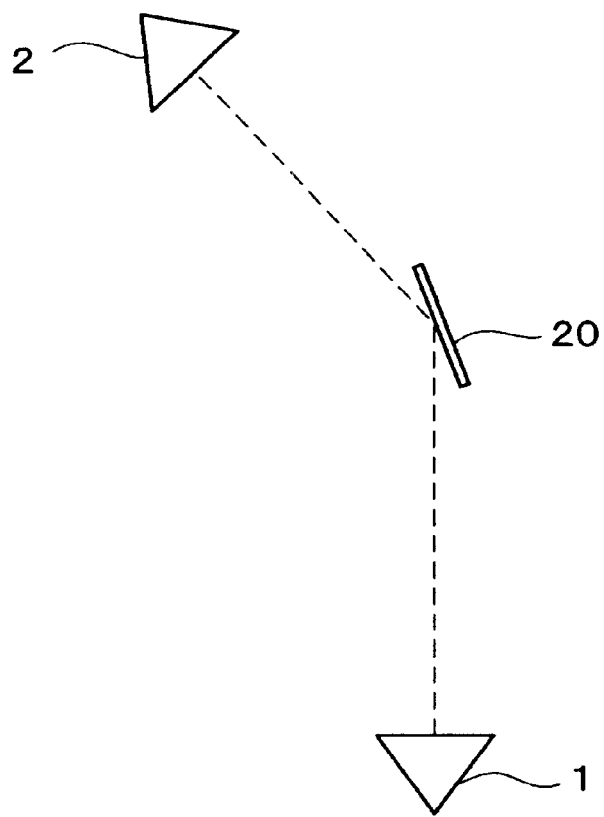
(b)
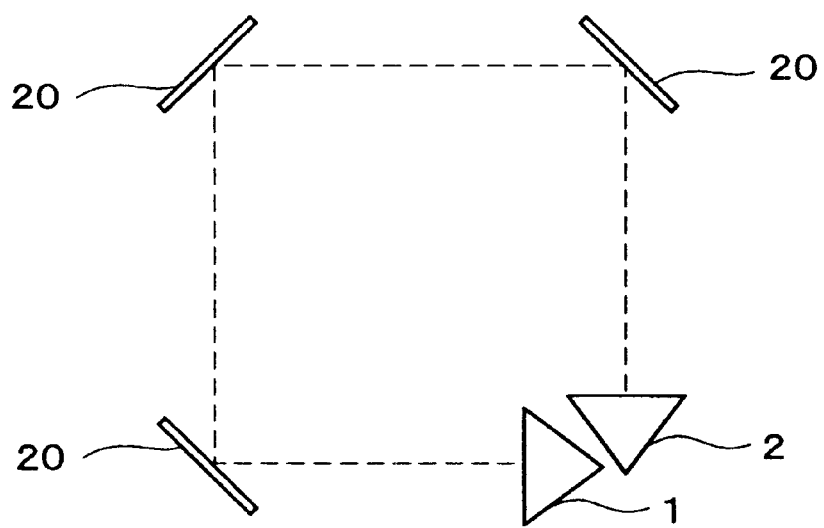

FIG. 21
(a)
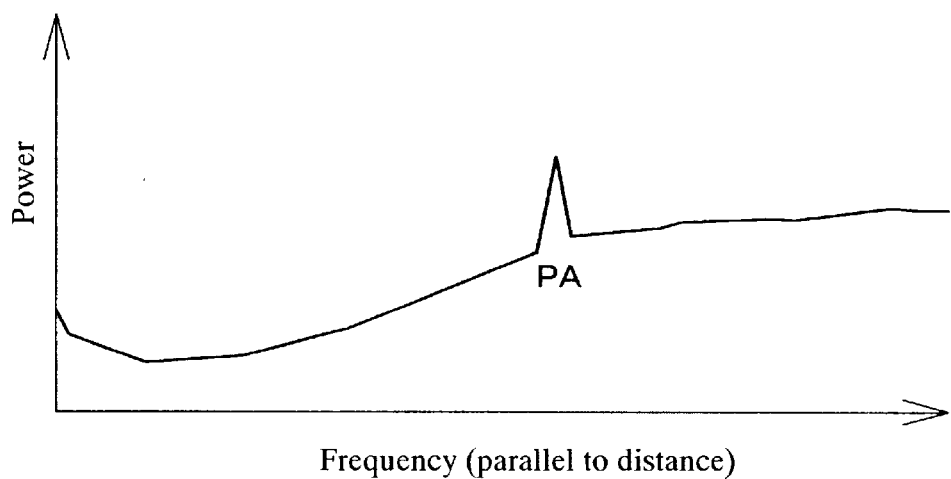
(b)
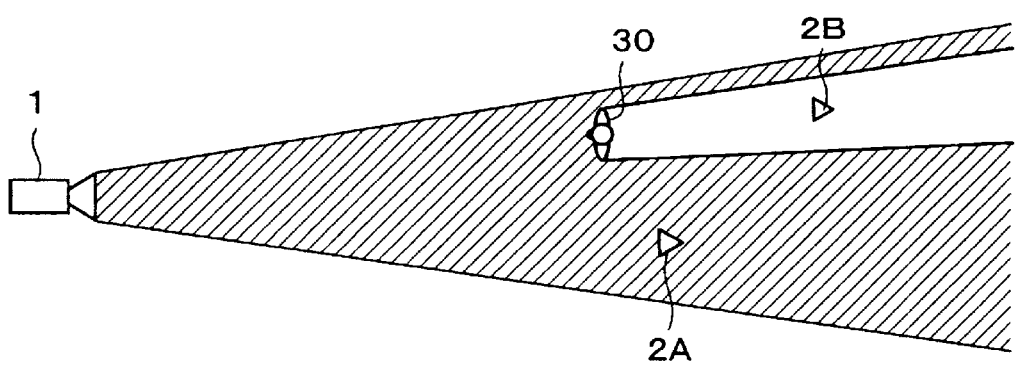

FIG. 22
(a)
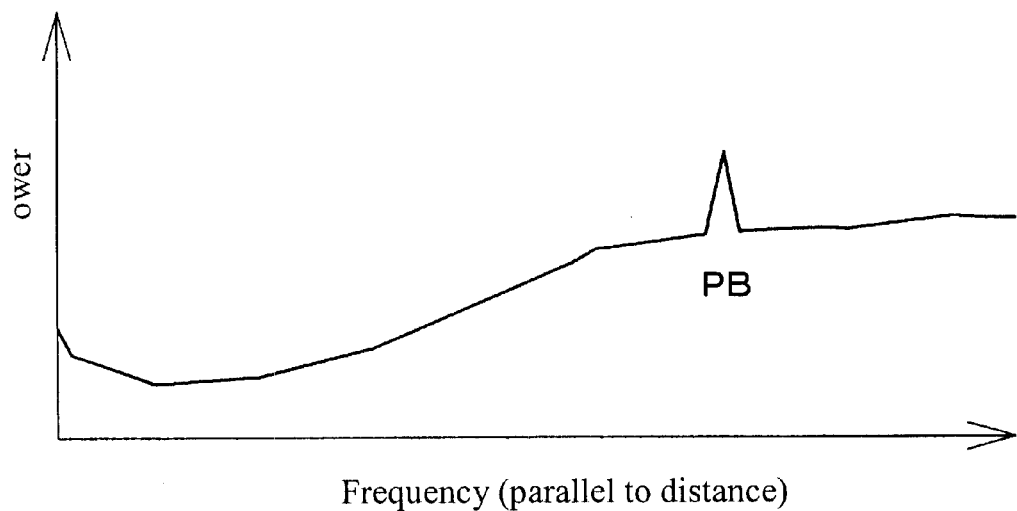
Frequency (parallel to distance)
(b)
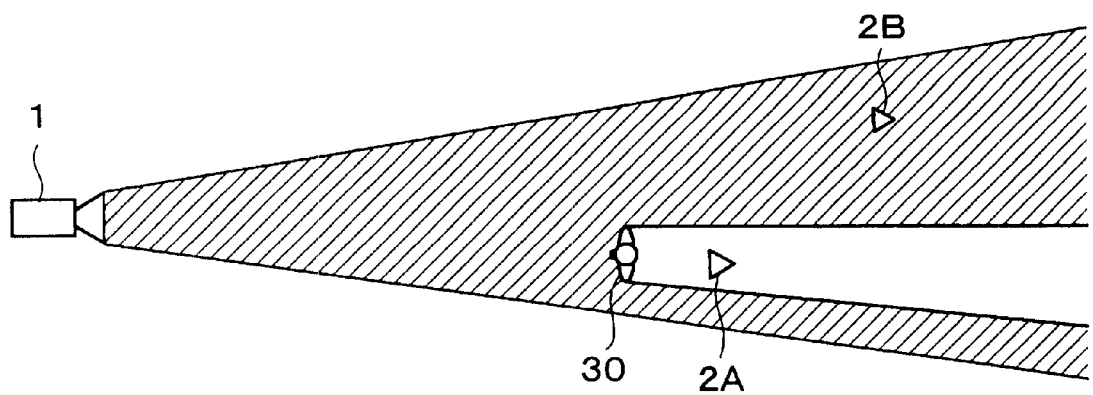

IMMERSION OBJECT DETECTION SYSTEM AND METHOD

BACKGROUND OF THE INVENTION

1. Field of the Invention

The present invention relates to an immersion object detection method for irradiating an electric wave such as a millimeter wave within e.g., a detection area to detect a reflected wave therefrom, thereby detecting existence of the immersion object within the detection area, and an immersion object detection system using such a method.

2. Description of the Background Art

Conventionally, with respect to crime prevention sensors for detecting a human body and the like, various types of sensors such as an infrared sensor, an ultrasonic sensor, an electric wave sensor and the like have been proposed. Among the above-mentioned sensors, the electric wave sensor, which is considerably less susceptible to natural environmental variation factors such as rain, snow and wind even when used outdoors, makes it possible to detect a human body within the detection area with high precision.

With respect to the electric wave sensor that includes various types, an electric wave sensor having the following construction has been disclosed. The electric wave sensor first irradiates an electric wave, in which the frequency has been modulated, to a detection area. Then, it receives a reflected wave of the irradiated electric wave and generates a beat wave by mixing the reflected wave with the original electric wave. This beat wave is spectrum-analyzed to examine the frequency at which a peak exists and the intensity thereof, thereby detecting a human body and the distance therefrom.

Thus, the electric wave sensor is free from the influences of external disturbances due the natural environmental environment factors, and also detects the position of the detected human body, so that this provides excellent performances as a crime prevention sensor.

On the other hand, with respect to the infrared sensor, etc., a regression reflecting type photoelectric sensor for detecting an immersion of an object by using a regression reflecting method. With respect to the regression reflecting method, in the case of an infrared sensor, a reflection plate, etc. is previously placed within a detection area, and an infrared ray is irradiated to this reflection plate, so that by detecting a reflected light from the reflection plate, any immersion of an object such as a human body into the detection area is detected.

As described above, the electric wave sensor detects a human body by examining the frequency at which a peak exists and the intensity thereof in a beat wave that has been spectrum-analyzed. Here, in general, a human body has a low reflectance to an electric wave. Moreover, it has been known that the intensity of the reflected wave decreases in inversely proportional to the distance raised to the fourth power. More specifically, in the case that a human body to be detected is far away from the sensor main body, the intensity of the reflected wave from the human body decreases considerably.

On the other hand, the beat wave obtained by mixing the reflected wave to be received with the original transmission wave contains noise components. These noise components result from a thermal noise in a circuit for generating a transmission wave and in a receiving circuit, a noise caused by a mixer for mixing a reflected wave and a transmission wave and a noise contained in a transmission wave as it own.

Therefore, the wave sensor has a problem that the intensity of the reflected wave from the human body positioned far away from the sensor main body come to reduce to the same level as the intensity of the above-mentioned noise components or a level weaker than the intensity thereof, thereby failing to detect the human body.

On the other hand, the above-mentioned regression reflecting type sensor has a problem that it can detect immersion of any object between the sensor and the reflection plate while it fails to detect how far the immersion object is away from the sensor main body and to identify the immersion object.

SUMMARY OF THE INVENTION

The present invention has been devised to solve the above-mentioned problems, and an objective thereof is to provide an immersion object detection method capable of detecting an immersion object within a detection target area irrespective of its short distance/long distance and of specifying the position thereof, and an immersion object detecting system using such a method.

In order to solve the above-mentioned problems, according to a first aspect of the present invention, an immersion object detection method includes the steps of irradiating a wave to a detection target area; detecting a reflected wave from the detection target area by reflected wave detection means; and determining that an immersion object exists within the detection target area in a case that the reflected wave cannot be detected from at least one reflection member among a plurality of reflection members placed within the detection target area, and simultaneously specifying a position of the immersion object in accordance with a position of the reflection member which cannot detect.

In accordance with the above-mentioned method, first, the wave irradiated to the detection target area is reflected in the detection target area, and the reflected wave is detected by the reflected wave detection means. Moreover, a plurality of reflection members are placed within the detection target area. Then, in the above-mentioned method, if there is any reflection member which cannot detect by the reflected wave detection means, a detecting operation of the immersion object and a specifying operation of the position thereof are carried out.

Here, if the reflection members are made of a material having high reflectance to the wave, it is possible to detect the reflected wave from a wider range as compared with a case in which, e.g., the reflected wave from the immersion object itself are detected. Moreover, in accordance with the position of the reflection member which cannot detect, the position of the immersion object is specified so that it becomes possible to provide the detection target area as a wider area, and also to specify the position of the immersion object.

Moreover, depending on the kind of the wave and the performance of the reflected wave detection means, in some cases, it is not possible to specify the position of the immersion object based on only the directly reflected wave from the immersion object. However, the application of the above-mentioned method makes it possible to specify the position of the immersion object even in such a case.

Furthermore, according to the first aspect, the immersion object detection method is characterized in that the plurality of reflection members are placed such that distances from the reflected wave detection means to each of the reflection members are different, respectively, and the position of the immersion object is specified as any position between a reflection member having the furthest distance from the reflected wave detection means among the reflection members which can detect the reflected wave and a reflection member having the nearest distance from the reflected wave detection means among the reflection members which cannot detect the reflected wave.

In the above-mentioned method, the plurality of reflection members are placed such that the distances from the reflected wave detection means to the respective reflection members are different, respectively. In the case an immersion object exists within the detection target area in this state, the reflected wave from the reflection member placed in a position closer to the reflected wave detection means than the immersion object are detected, while the reflected wave from the reflection member placed in a position farther from the reflected wave detection means than the immersion object are not detected because they are shielded by the immersion object. By utilizing this fact, the above-mentioned method specifies the position of the immersion object. Therefore, it becomes possible to accurately specify the position of the immersion object by using a comparatively simple analysis.

Furthermore, according to the first aspect of the present invention, the immersion object detection method is characterized in that the plurality of reflection members are placed such that at least one reflection member among the plurality of reflection members has a different direction with respect to the reflected wave detection means as compared with the other reflection members.

In the above-mentioned method, the reflection member is provided in a different direction with respect to the reflected wave detection means. At this time, if the reflected wave detection means cannot detect the reflected wave from the reflection member provided in a certain direction, and then cannot detect the reflected wave from a reflection member provided in a different direction, it is determined that the immersion object has moved from the certain direction to another direction with respect to the reflected wave detection means. Thus, the above-mentioned immersion object detection method makes it possible to specify the moving direction of an immersion object.

Furthermore, according to the first aspect of the present invention, the immersion object detection method is characterized in that in a case that the immersion object exists in a short-distance area having a distance of not more than a predetermined value from the reflected wave detection means, the position of the immersion object is specified by analyzing a directly reflected wave from the immersion object, and in a case that the immersion object exists in a long-distance area having a distance of not less than a predetermined value from the reflected wave detection means, the position of the immersion object is specified in accordance with the position of the reflection member which cannot detect.

In the above-mentioned method, when the immersion object exists in the short-distance area, the position of the immersion object is specified by the directly reflected wave from the immersion object, while when the immersion object exists in the long-distance area, the position of the immersion object is specified in accordance with the position of the reflection member which cannot detect. More specifically, in a short-distance in which a sufficient intensity of the reflected wave is ensured, the position is precisely detected by the directly reflected wave from the immersion object, while in a long-distance in which the intensity of reflected wave becomes weaker, the position is detected based on the reflected wave from the reflection member as described above.

Therefore, as compared with a case in which the position is only specified by the directly reflected wave from the immersion object, it becomes possible to detect the immersion object in an area covering wider range. Moreover, in the short distance in which more detailed information is required than the case in which only the position detection is carried out based on the reflected wave from the reflection member, it becomes possible to more precisely detect the position of the immersion object.

Moreover, even when the specifying method of the position of the immersion object is changed in accordance with the distance from the reflected wave detection means, it is not necessary to change the kind of the wave irradiated from a wave irradiation means or to change the kind of the wave detected by the reflected wave detection means. More specifically, the detection of the immersion object can be carried out from the short distance to the long distance by using a single system so that it is possible to reduce the costs and also to reduce the system scale as compared with a case in which, e.g., a plurality of systems are installed depending on distances.

Furthermore, according to the first aspect of the present invention, the immersion object detection method includes the steps of: placing a reference object for comparing with the immersion object in the short-distance area within the detection target area; irradiating the wave to the detection target area, thereby detecting the reflected wave from the reference object by the reflected wave detection means; and creating reference object information based on the reflected wave to be detected, wherein in the case that the immersion object exists in the short-distance area, the position of the immersion object is specified, and the reference object information is compared with immersion object information created based on the reflected wave from the immersion object detected by the reflected wave detection means, thereby specifying the kind of the immersion object. The above-mentioned feature is also applied to a second aspect of the present invention which will be described below.

Here, the reference object is desirable to use a member which is a target to be detected in its immersion within the detection target area. Moreover, in the case when a plurality of objects to be detected in their immersion exist, it is preferable to create reference object information for each of the objects.

In accordance with the above-mentioned method, the kind of the immersion object is specified by comparing the current information detected by the reflected wave detection means with the reference object information. Thus, a controlling operation is available in which even when an object other than the object which is a target to be detected in its immersion enters the detection target area, this object is not dealt as an immersion object. Consequently, it is possible to reduce erroneous detection.

Furthermore, according to the first aspect of the present invention, the immersion object detection method is characterized in that the wave to be irradiated is an electric wave. The above-mentioned feature is also applied to the second aspect of the present invention which will be described below.

In the above-mentioned method, since the electric wave is irradiated to the detection target area to detect any immersion object, the method is less susceptible to adverse effects to detection, such as bad visibility due to rain, fog, snow, etc., and bad visibility due to smoke pot used by a dubious character so as to intervene detection. Moreover, since the electric wave has the property of passing through objects, the reflection member to be placed within the detection target area may be placed, e.g., under ground or inside a wall. Thus, it becomes possible to construct an immersion object detection system without giving adverse effects to the environment.

Moreover, in the case of irradiation of the electric wave, by detecting the directly reflected wave from the immersion object, the position of the immersion object can be specified. Furthermore, by analyzing the level of the directly reflected wave from the immersion object, it is possible to specify the kind of the immersion object.

Furthermore, according to the first aspect of the present invention, the immersion object detection method includes the steps of: irradiating the wave to the detection target area in a state that no immersion object exists within the detection target area, thereby detecting the reflected wave from the reflection member by the reflected wave detection means; and creating normal state information with respect to the reflection member based on the reflected wave to be detected, wherein the reflection member which cannot detect is specified by comparing the normal state information with information created based on the reflected wave detected by the reflected wave detection means. The above-mentioned feature is also applicable to the second and third aspects of the present invention which will be described below.

In the above-mentioned method, by comparing the current information detected by the reflected wave detection means with the normal state information, the reflection member which cannot detect is specified. Therefore, since the reflection member which cannot detect is accurately specified, it is possible to detect an immersion object and to specify the position thereof accurately.

According to the second aspect of the present invention, the immersion object detection method includes the steps of irradiating a wave to a detection target area; detecting a reflected wave from the detection target area by reflected wave detection means; determining that an immersion object exists within the detection target area in a case that the reflected wave cannot be detected from one reflection member placed within the detection target area, and simultaneously specifying a position of the immersion object in accordance with a position of the reflection member which cannot detect, wherein the position of the immersion object is specified by analyzing a directly reflected wave from the immersion object in a case that the immersion object exists in a short-distance area having a distance of not more than a predetermined value from the reflected wave detection means, while in a case that the immersion object exists in a long-distance area having a distance of not less than the predetermined value from the reflected wave detection means, the reflected wave cannot be detected from the reflection member by the reflected wave detection means, so that existence of the immersion object is specified between a position in which a distance from the reflected wave detection means is the predetermined value and a position where the reflection member is placed.

In the above-mentioned method, first, the wave is reflected within the detection target area, and the reflected wave is detected by the reflected wave detection means. Here, one reflection member is placed within the detection target area. Then, in the above-mentioned method, in the case that an immersion object exists in the short-distance area, the position of the immersion object is specified by using the directly reflected wave from the immersion object, and in the case that an immersion object exists in the long-distance area, the reflection member cannot detect by the reflected wave detection means, thereby specifying the position of the immersion object at the long distance area between the position of the reflected wave detection means and the reflection member.

In other words, in a short-distance in which a sufficient intensity of the reflected wave is ensured, the position of the immersion object is precisely detected by using the directly reflected wave therefrom, while in a long-distance in which the intensity of reflected wave becomes weaker, the position is detected based on the reflected wave from the reflection member as described above. Therefore, as compared with a case in which the position is specified by using only the directly reflected wave from the immersion object, it becomes possible to detect the immersion object in an area covering wider range. Moreover, in the short distance in which more detailed information is required than the case in which only the position detection is carried out based on the reflected wave from the reflection member, it becomes possible to more precisely detect the position of the immersion object.

Moreover, even when the specifying method of the position of the immersion object is changed in accordance with the distance from the reflected wave detection means, it is not necessary to change the kind of wave irradiated from the wave irradiation means or to change the kind of wave detected by the reflected wave detection means. In other words, the detection of the immersion object can be carried out from the short distance to the long distance by using a single immersion object detection system using the above-mentioned method so that it is possible to reduce the costs and also to reduce the system scale as compared with cases in which, e.g., a plurality of systems are placed in accordance with distances.

According to a third aspect of the present invention, the immersion object detection method includes the steps of: irradiating a wave to a detection target area; detecting a reflected wave from the detection target area by reflected wave detection means; and determining that an immersion object exists within the detection target area in a case that the reflected wave cannot be detected from one reflection member placed within the detection target area, wherein the wave to be irradiated is an electric wave.

In the above-mentioned method, first, the above-mentioned electric wave is reflected within the detection target area, and the reflected wave is detected by the reflected wave detection means. Here, one reflection member is placed within the detection target area. Then, in the above-mentioned method, if there is a reflection member which cannot detect by the reflected wave detection means, any immersion object is detected.

Here, when the reflection members are made of a material having high reflectance to the electric wave irradiated by the wave irradiation means, it is possible to detect the reflected wave from a wider area as compared with a case in which, e.g., the reflected wave from the immersion object itself is detected. Moreover, since the position of the immersion object is specified in accordance with the position of the reflection member which cannot detect, it becomes possible to set the detection target area as a wider area.

In the above-mentioned method, electric wave is irradiated to the detection target area, thereby detecting any immersion object. As described above, since the electric wave has the property of passing through objects, the method is less susceptible to adverse effects to detection, such as bad visibility due to rain, fog, snow, etc., and bad visibility due to smoke pot used by a dubious character so as to intervene detection. Moreover, the reflection member placed within the detection target area may be placed, e.g., under ground or inside a wall, so that it becomes possible to construct an immersion object detection system without giving adverse effects to the environment. In addition, as compared with a case using a light, an infrared ray, etc., it is possible to set a wider detection target area (e.g., approximately 100 m).

Moreover, in the case of the application of the electric wave, even when dusts, etc. adhere to the reflection member, the effects thereof exerted when the reflected wave from the reflection member is detected by the reflected wave detection means is so small that no problems are raised in practical use. Thus, it is possible to eliminate the maintenance of the reflection members.

According to a fourth aspect of the present invention, an immersion object detection system includes: wave irradiation means of irradiating a wave to a detection target area; a plurality of reflection members placed within the detection target area; reflected wave detection means in which the wave irradiated from the wave irradiation means detects a reflected wave from the detection target area; and immersion object detection means of detecting an immersion object within the detection target area, wherein in a case that the reflected wave detection means cannot detect the reflected wave from at least one reflection member among the plurality of reflection members, the immersion object detection means determines that the immersion object exists within the detection target area and specifies a position of the immersion object in accordance with a position of the reflection member which cannot detect.

In accordance with the above-mentioned constitution, first, the wave irradiated by the wave irradiation means is reflected within the detection target area, and the reflected wave is detected by the reflected wave detection means. Here, a plurality of reflection members are placed within the detection target area. Then, if there is any reflection member which cannot detect by the reflected wave detection means, the reflected wave detection means detects the immersion object and specifies the position thereof.

Here, when the reflection members are made of a material having high reflectance to the wave irradiated from the wave irradiation means, it is possible to detect the reflected wave from a wider area as compared with a case in which, e.g., the reflected wave from the immersion object itself is detected. Moreover, the position of the immersion object is specified in accordance with the position of the reflection member which cannot detect, so that it becomes possible to set the detection target area as a wider area, and also to specify the position of the immersion object.

Moreover, depending on the kind of the wave and the performance of the reflected wave detection means, in some cases, it is not possible to specify the position of the immersion object only based on the directly reflected wave from the immersion object. However, the application of the above-mentioned method makes it possible to specify the position of the immersion object even in such a case.

Furthermore, according to the fourth aspect of the present invention, the immersion object detection system is characterized in that the plurality of reflection members are placed such that distances from the reflected wave detection means to each of the reflection members are different, respectively, and the immersion object detection means determines that the immersion object exists between a reflection member having a furthest distance from the reflected wave detection means among the reflection members which can detect the reflected wave and a reflection member having a nearest distance from the reflected wave detection means among the reflection members which cannot detect the reflected wave.

In the above-mentioned constitution, the plurality of reflection members are placed such that the distances from the reflected wave detection means to each of the reflection members are different, respectively. In the case that any immersion object exists within the detection target area in this state, the reflected wave from the reflection members placed in positions closer to the reflected wave detection means than the immersion object is detected, while the reflected wave from the reflection members placed in positions farther from the reflected wave detection means than the immersion object is not detected because they are shielded by the immersion object. By utilizing this fact, the immersion object detection means specifies the position of the immersion object. Therefore, it becomes possible to accurately specify the position of the immersion object by using a comparatively simple analysis.

Furthermore, according to the fourth aspect of the present invention, the immersion object detection system is characterized in that the plurality of reflection members are placed such that at least one reflection member among the plurality of reflection members has a different direction with respect to the reflected wave detection means as compared with the other reflection members.

In the above-mentioned constitution, the reflection member is provided in a different direction with respect to the reflection wave detecting means. At this time, when the reflected wave detection means cannot detect the reflected wave from the reflection member provided in a certain direction, and then cannot detect the reflected wave from a reflection member provided in a different direction, the immersion object detection means can determine that the immersion object has moved from the certain direction to another direction with respect to the reflected wave detection means. Thus, the above-mentioned immersion object detection system makes it possible to specify the moving direction of an immersion object.

Furthermore, according to the fourth aspect of the present invention, the immersion object detection system is characterized in that in a case that the immersion object exists in a short-distance area where a distance from the reflected wave detection means is not more than a predetermined value, the immersion object detection means specifies the position of the immersion object by analyzing a directly reflected wave from the immersion object, and in a case that the immersion object exists in a long-distance area where a distance from the reflected wave detection means is not less than the predetermined value, the immersion object detection means specifies the position of the immersion object in accordance with the position of the reflection member which cannot detect.

In the above-mentioned constitution, in the case that an immersion object exists in the short-distance area, the position thereof is specified by analyzing the directly reflected wave from the immersion object, and in the case that an immersion object exists in the long distance area, the position thereof is specified in accordance with the position of the reflection member which cannot detect. In other words, in a short-distance in which a sufficient intensity of the reflected wave is ensured, the position is precisely detected by using the directly reflected wave from the immersion object, while in a long-distance in which the intensity of the reflected wave becomes weaker, the position is detected based on the reflected wave from the reflection member as described above. Therefore, as compared with a case in which the position is specified by using only the directly reflected waves from the immersion object, it becomes possible to detect an immersion object in an area covering wider range. Moreover, in the short distance in which more detailed information is required than the case in which only the position is detected based on the reflected wave from the reflection member, it becomes possible to more precisely detect the position of an immersion object.

Moreover, even when the specifying method of the position of an immersion object is changed depending on the distance from the reflected wave detection means, it is not necessary to change the kind of the wave irradiated from the wave irradiation means or to change the kind of wave detected by the reflected wave detection means. In other words, the detection of an immersion object can be carried out from the short distance to the long distance by using a single system so that it is possible to reduce the costs and also to reduce the system scale as compared with a case in which, e.g., a plurality of systems are placed depending on distances.

Furthermore, according to the fourth aspect of the present invention, the immersion object detection system further includes a storage means of previously placing a reference object for comparing with the immersion object in the short-distance area within the detection target area, thereby storing reference object information of the reflected wave from the reference object detected by the reflected wave detection means, wherein the immersion object detection means compares the reference object information stored in the storage means with information detected by the reflected wave detection means in a case that the immersion object is detected in the short-distance area, thereby specifying the kind of the immersion object. The above-mentioned feature is also applied to a fifth aspect of the present invention which will be described below.

In accordance with the above-mentioned constitution, the immersion object detection means compares current information detected by the reflected wave detection means with the reference object information stored in the storage means so that the kind of the immersion object is specified. Thus, a controlling operation can be carried out even when an object other than the object which is a target to be detected in its immersion enters the detection target area, this object is not dealt as an immersion object. Consequently, it is possible to reduce erroneous detection.

Furthermore, according to the fourth aspect of the present invention, the immersion object detection system is characterized in that the wave to be irradiated is an electric wave. The above-mentioned feature is also applied to the fifth aspect of the present invention which will be described below.

In the above-mentioned constitution, since the electric wave is irradiated to the detection target area to detect the immersion object, the method is less susceptible to adverse effects to detection, such as bad visibility due to rain, fog, snow, etc., and bad visibility due to smoke pot used by a dubious character so as to intervene detection. Moreover, since the electric wave has the property of passing through objects, the reflection member to be placed within the detection target area may be placed, e.g., under ground or inside a wall. Thus, it becomes possible to construct an immersion object detection system without giving adverse effects to the environment.

Moreover, in the case of irradiation of the electric wave, the position of the immersion object can be specified by detecting the directly reflected wave from the immersion object. Furthermore, by analyzing the level of the directly reflected wave from the immersion object, it is possible to specify the kind of the immersion object.

Furthermore, in the fourth aspect of the present invention, the immersion object detection system further includes a storage means of storing normal state information of the reflected wave from the reflection member, detected by the reflected wave detection means, in a state that no immersion object exists within the detection target area, wherein the immersion object detection means compares the normal state information stored in the storage means with information detected by the reflected wave detection means, thereby specifying the reflection member which cannot detect. The above-mentioned feature is also applicable to the fifth and sixth aspects of the present invention which will be described below.

In the above-mentioned constitution, the immersion object detection means compares the current information detected by the reflected wave detection means with the normal state information stored in the storage means to specify the reflection member which cannot detect. Therefore, since the reflection member which cannot detect is accurately specified, it is possible to detect an immersion object and to specify the position thereof accurately.

Furthermore, according to the fourth aspect of the present invention, the immersion object detection system is characterized in that the reflection members are placed within a range of a predetermined height from the ground surface. The above-mentioned feature is also applicable to the fifth and sixth aspects of the present invention which will be described below.

In accordance with the above-mentioned constitution, since the reflection members are placed within the range having a predetermined height from the ground surface, any immersion object in the detection target area with a height level other than the range having the predetermined height is not detected. Therefore, e.g., by setting the range of the predetermined height to the height range from the abdomen to the chest of the human body, it is possible to limit the object to be detected in its immersion to a human body without detecting small animals such as dogs and cats. Consequently, it becomes possible to eliminate the possibility of detection of unnecessary immersion objects.

Furthermore, according to the fourth aspect of the present invention, the immersion object detection system is characterized in that the reflection members are objects previously placed within the detection target area. The above-mentioned feature is also applicable to the fifth and sixth aspects of the present invention which will be described below.

In accordance with the above-mentioned constitution, since the objects previously placed within the detection target area are used as the reflection members, it is not necessary to newly place reflection members. Thus, it becomes possible to reduce the costs required for constructing the immersion object detection system, and also to provide the immersion object detection system without causing adverse effects on the environment.

Furthermore, according to the fourth aspect of the present invention, the immersion object detection system is characterized in that a deflection means of deflecting a course of the wave irradiated by the wave irradiation means is provided between the wave irradiation means and the reflection members. The above-mentioned feature is also applicable to the fifth and sixth aspects of the present invention which will be described below.

Here, "deflection" refers to the function for changing the course direction of the wave by utilizing factors such as reflection, refraction or diffraction of wave. With respect to the deflection means, e.g., members such as flat-surface reflection plates may be preferably used.

In accordance with the above-mentioned constitution, the detection target area is provided in a non-linear form so that even the entire periphery of a building or a winding place having bad visibility may be set as the detection target area. In other words, the single system can be applied to areas having various shapes, so that it becomes possible to reduce the costs and scale of the system as compared with a case in which a plurality of systems are placed in respective linear detection areas.

According to the fifth aspect of the present invention, the immersion object detection system includes: wave irradiation means of irradiating a wave to a detection target area; a reflection member placed within the detection target area; reflected wave detection means in which the wave irradiated from the wave irradiation means detects the reflected wave from the detection target area; and immersion object detection means of detecting the immersion object within the detection target area, wherein in a case that the immersion object exists in a short-distance area where a distance from the reflected wave detection means is not more than a predetermined value, the immersion object detection means specifies a position of the immersion object by analyzing a directly reflected wave from the immersion object, and in a case that the immersion object exists in a long-distance area where a distance from the reflected wave detection means is not less than the predetermined value, the reflected wave detection means cannot detect the reflected wave from the reflection member, so that the immersion object detection means specifies that the immersion object exists between a position in which a distance from the reflected wave detection means is the predetermined value and a position where the reflection member is placed.

In accordance with the above-mentioned constitution, first, the wave irradiated by the wave irradiation means is reflected within the detection target area, and the reflected wave is detected by the reflected wave detection means. Here, one reflection member is placed within the detection target area. In the case that an immersion object exists in the short-distance area, the immersion object detection means specifies the position of the immersion object by using directly reflected wave from the immersion object, and in the case that an immersion object exists in the long-distance area, the reflection member cannot detect by the reflected wave detection means, the immersion object detection means specifies the position of the immersion object at the long distance area between the position of the reflected wave detection means and the reflection member.

In other words, in a short-distance in which a sufficient intensity of the reflected wave is ensured, the position is precisely detected by using the directly reflected wave from the immersion object, while in a long-distance in which the intensity of the reflected wave becomes weaker, the position is detected based on the reflected wave from the reflection member as described above. Therefore, as compared with a case in which the position is specified by using only the directly reflected wave from the immersion object, it becomes possible to detect an immersion object in an area covering wider range. Moreover, in the short distance in which more detailed information is required than the case in which only the position detection is carried out based on reflected waves from the reflection member, it becomes possible to more precisely detect the position of an immersion object.

Moreover, even when the specifying method of the position of an immersion object is changed in accordance with the distance from the reflected wave detection means, it is not necessary to change the kind of the wave irradiated from the wave irradiation means or to change the kind of the wave detected by the reflected wave detection means. In other words, an immersion object can be detected from the short distance to the long distance by using a single immersion object detection system using the above-mentioned method so that it is possible to reduce the costs and also to reduce the system scale as compared with a case in which, e.g., a plurality of systems are placed depending on distances.

According to the sixth aspect of the present invention, the immersion object detection system includes: wave irradiation means of irradiating a wave to a detection target area; a reflection member placed within the detection target area; reflected wave detection means in which the wave irradiated from the wave irradiation means detects the reflected wave from the detection target area; and immersion object detection means of detecting the immersion object within the detection target area, wherein the wave irradiated from the wave irradiation means is an electric wave, and in a case that the reflected wave detection means cannot detect the reflected wave from the reflection member, the immersion object detection means determines that the immersion object exists within the detection target area, and the immersion object detection means specifies that the immersion object exists between a position of the reflected wave detection means and a position of the reflection member.

In accordance with the above-mentioned constitution, first, the electric wave irradiated by the wave irradiation means is reflected within the detection target area, and the reflected wave is detected by the reflected wave detection means. Here, one reflection member is placed within the detection target area. Then, in the case that there is the reflection member which cannot detect by the reflection wave detection means, the immersion object detection means detects the immersion object and specifies the position thereof Here, when the reflection members are made of a material having high reflectance to the electric wave irradiated from the wave irradiation means, it is possible to detect the reflected wave from a wider area as compared with a case in which, e.g., the reflected wave from the immersion object itself is detected. Moreover, the position of the immersion object is specified in accordance with the position of the reflection member which cannot detect, so that it becomes possible to set the detection target area as a wider area, and also to specify the position of the immersion object.

In the above-mentioned constitution, the electric wave is irradiated to the detection target area to detect an immersion object. As described above, since the electric wave has the property of passing through objects, the system is less susceptible to adverse effects to detection, such as bad visibility due to rain, fog, snow, etc., and bad visibility due to smoke pot used by a dubious character so as to intervene detection. Moreover, the reflection member placed within the detection target area may be placed, e.g., under ground or inside a wall. Thus, it becomes possible to construct an immersion object detection system without giving adverse effects to the environment. Moreover, as compared with a case using a light, an infrared ray, etc., it is possible to provide a wider detection target area (e.g., approximately 100 m).

In the case of the application of the electric wave, even when dusts, etc. adhere to the reflection member, the effects thereof exerted when reflected waves from the reflection member are detected by the reflected wave detection means are so small that no problems are raised in practical use. Thus, it is possible to eliminate the maintenance of the reflection members.

BRIEF DESCRIPTION OF THE DRAWINGS

FIG. 5A is a graph showing spectrum data in the case that a human body which is an object to be detected has invaded to a position closer to the radar than the reflection members, and FIG. 5B is a schematic view showing a state that this case is viewed in the direction of the side face;

FIG. 6A is a graph showing spectrum data in the case that a human body has invaded to a position between the reflection members, and FIG. 6B is a schematic view showing a state that this case is viewed in the direction of the side face;

FIG. 10A is a plan view in which the radar and the reflection members in a first installation example are viewed from above, and FIG. 10B is a side view in which these members are viewed laterally;

FIG. 11A is a plan view in which the radar and the reflection members in a second installation example are viewed from above, and FIG. 11B is a side view in which these members are viewed laterally;

FIG. 12A is a plan view in which the radar and the reflection members in a third installation example are viewed from above, and FIG. 12B is a side view in which these members are viewed laterally;

FIG. 13A is a plan view in which the radar and the reflection members in a fourth installation example are viewed from above, and FIG. 13B is a side view in which these members are viewed laterally;

FIG. 14A is a plan view in which the radar and the reflection members in a fifth installation example are viewed from above, and FIG. 14B is a side view in which these members are viewed laterally;

FIG. 16A is a plan view in which the radar and the reflection members in a seventh installation example are viewed from above, and FIG. 16B is a side view in which these members are viewed laterally;

FIG. 18A is a plan view in which the radar and the reflection members in the ninth installation example are viewed from above, and FIG. 18B is a side view in which these members are viewed laterally;

FIG. 20A is a schematic view showing a state in which a radar is bent in an arrow-point shape, and FIG. 20B is a schematic view showing a state in which a radar is bent in a square shape;

FIG. 21A is a graph showing spectrum data in a case that a human body has invaded in a manner so as to shield one of the reflection members from the radar, and FIG. 21B is a schematic view showing a state that this case is viewed from above; and FIG. 22A is a graph showing spectrum data in a case that a human body has invaded in a manner so as to shield a reflection member other than the one shown in FIG. 21 from the radar, and FIG. 22B is a schematic view showing a state that this case is viewed from above.

DETAILED DESCRIPTION OF THE PREFERRED EMBODIMENTS

[First Embodiment]

Referring to FIGS. 1 through 18, one embodiment of the present invention will be described below.

Figure 1:
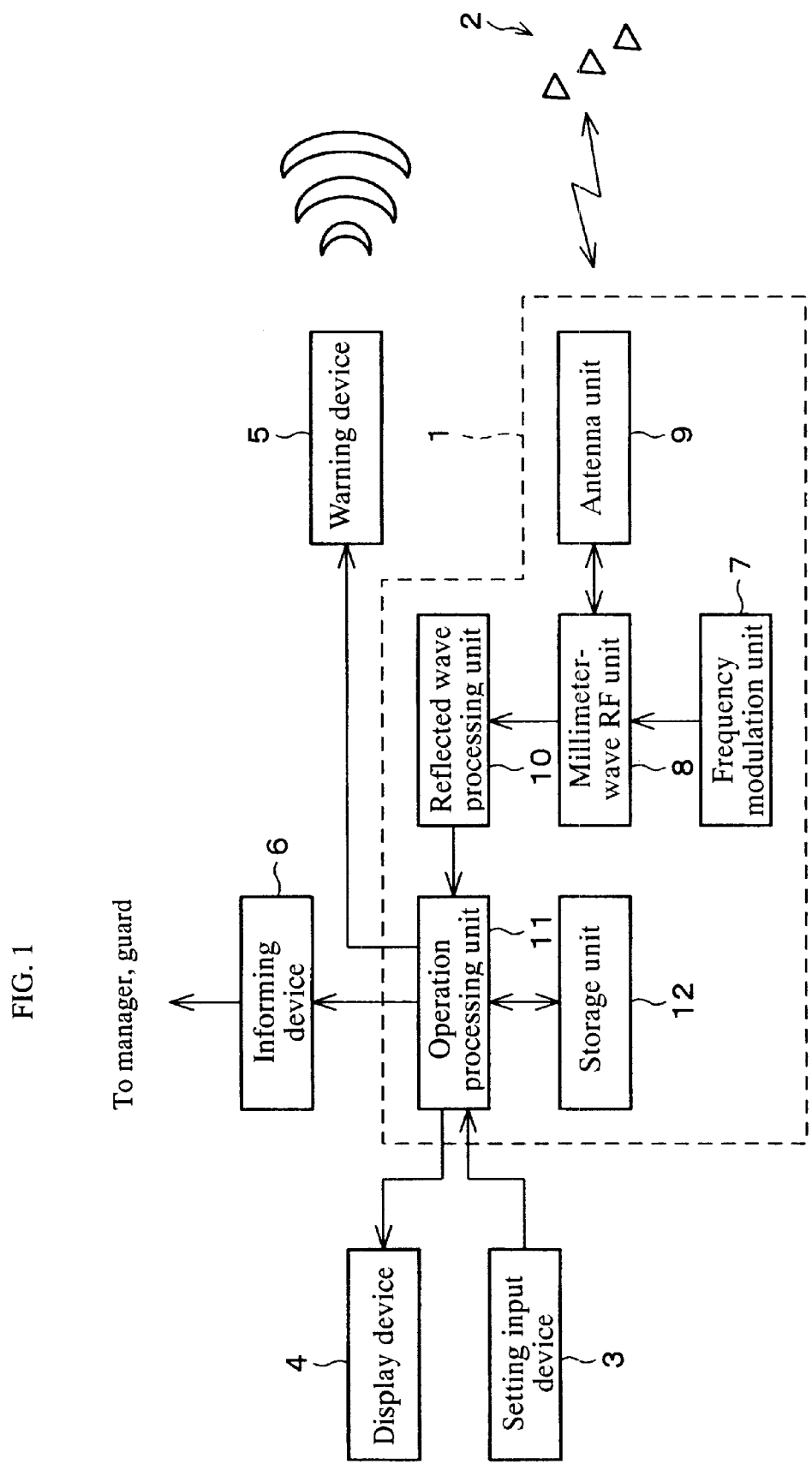
FIG. 1 is a block diagram showing a schematic construction of a crime prevention system according to one embodiment of the present invention.

FIG. 1 shows a schematic constitution of a crime prevention system (a immersion object detection system) in accordance with a preferred embodiment of the present invention. As shown in this Figure, the crime prevention system is provided with a radar unit 1, a group of reflection members 2, a setting input device 3, a display device 4, a warning device 5 and an informing device 6. A crime prevention sensor is constituted by the radar unit 1 and the group of reflection members 2, and this crime prevention sensor detects immersion of a person, etc. into a detection area.

The setting input device 3 is a device in which various pieces of setting information and instructions are inputted to the radar unit 1. With respect to this setting input device 3, e.g., input devices such as a keyboard, buttons and a pointing device may be used. The display device 4 is a device for displaying information detected by the radar unit 1, various pieces of setting information and operation states or the like. With respect to the display device 4, e.g., a display monitor such as a CRT (Cathode Ray Tube) and a LCD (Liquid Crystal Display) may be used.

The warning device 5 is a device that gives off an audible alarm upon detection of an immersion of a person as a detection target in the radar unit 1. Although not shown in the Figures, the warning device 5 is constituted by a voice synthesizing unit for generating the audible alarm, an amplifying unit for amplifying the audible alarm generated in the voice synthesizing unit and a speaker unit for converting an output from the amplifying unit into voice.

The informing device 6 is a device which, upon detection of immersion etc. of a person as a detection target in the radar unit 1, informs the manager for controlling the crime prevention system or a security guard or the like of this fact. The informing device 6 is constituted by, e.g., a communication device of radio or cable, etc.

The radar unit 1 constitutes an FM-CW system millimeter wave radar, and as shown in FIG. 1, is provided with a frequency modulation unit (a wave irradiation means) 7, a millimeter-wave RF (Radio Frequency) unit (a wave irradiation means/reflected wave detection means) 8, an antenna unit (a wave irradiation means/reflected wave detection means) 9, a reflected wave processing unit 10, an operation processing unit (an immersion object detection means) 11 and a storage unit (a storage means) 12.

The frequency modulation unit 7 is a block which modulates a frequency of the millimeter wave transmitted from the millimeter-wave RF unit 8. The frequency modulation unit 7 periodically carries out a process for linearly changing the frequency in its low and high levels within a predetermined range of frequencies. More specifically, e.g., it repeatedly carries out a frequency modulating operation in the following manner: it raises the frequency from the lowermost frequency at a fixed rate, and upon reaching the uppermost frequency, returns it again to the lowermost frequency. In other words, in this example, the frequency modulation is carried out in a manner so as to form a Saw-tooth Wave. Here, this frequency modulation may be carried out, e.g., in a sine wave form or a triangle wave form.

The millimeter-wave RF unit 8 is a block for generating an electric wave consisting of the frequency in a millimeter-wave band, and for generating a beat wave, which will be described later, in accordance with the frequency modulation control given by the frequency modulation unit 7. The millimeter wave generated herein is irradiated toward a detection area from the antenna unit 9 as an irradiation wave. Thereafter, the irradiated wave is reflected by any object existing within the detection area, and the reflected wave is received by the antenna unit 9, and inputted to the millimeter-wave RF unit 8 again. Then, in a mixer (not shown) provided in the millimeter-wave RF unit 8, the irradiated wave and the reflected wave are mixed to generate a beat wave.

Here, the millimeter wave generated by the millimeter-wave RF unit 8 is not limited to the electric wave consisting of the frequency in a millimeter-wave band and, e.g., an electric wave, so-called microwaves, may be used.

Figure 2:
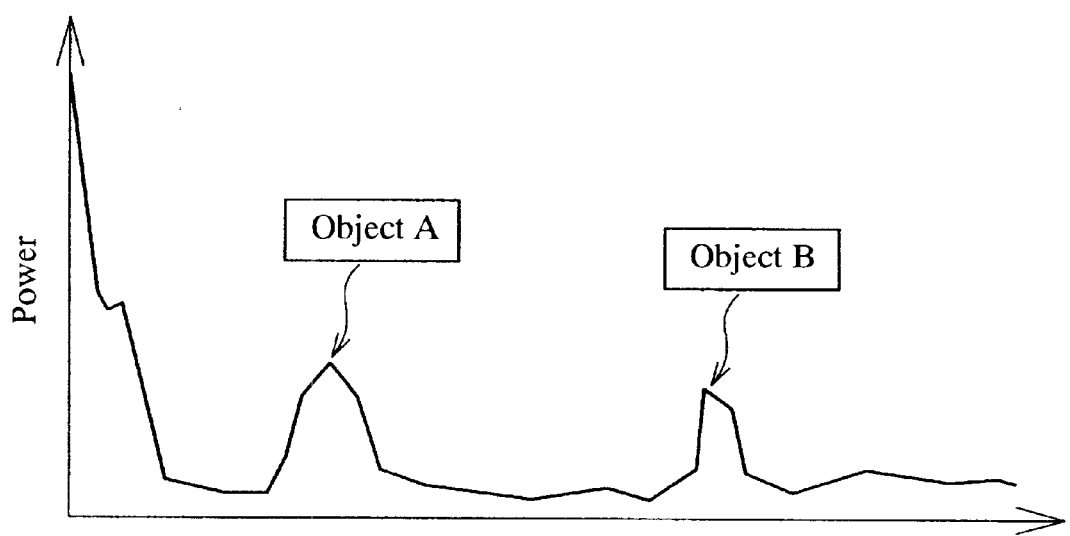
FIG. 2 is a graph showing one example of spectrum data in which the axis of abscissas represents the frequency and the axis of ordinates represents received power intensity (electric power)

The reflected wave processing unit 10 is a block for carrying out a FFT (Fast Fourier Transform) process to the beat wave generated in the millimeter-wave RF unit 8. The beat wave, which has been subjected to the FFT process, is spectrum-converted into spectrum data represented by parameters of the frequency and received power intensity. FIG. 2 is a graph showing one example of spectrum data in which the axis of abscissas represents the frequency and the axis of ordinates represents the received power intensity (electric power). In this graph, the position of each peak represents the reflected wave from any object, and the frequency corresponds to the distance from the object to the radar unit 1 main body.

The operation processing unit 11 is a block which detects any trespasser or any immersion object into the detection area based on spectrum data inputted from the reflected wave processing unit 10. In the detection process in this unit, inputted spectrum data is compared with data previously stored in the storage unit 12 to specify the object and to determine whether it is any trespasser or any immersion object. Here, in the case that data stored in the storage unit 12 have not been subjected to power correction depending on distances (which will be described later in detail), this operation processing unit 11 carries out the power correction depending on distances on inputted spectrum data and the data stored in the storage unit 12, and the two pieces of data are compared. Then, in accordance with the results of detection, actions such as an audible alarm instruction to the warning device 5 and an informing instruction to the informing unit 6 are taken.

Moreover, the operation processing unit 11 may have a counter function which can count the number of trespassers or immersion objects to detect the amount of passage.

The storage unit 12 is a block for storing a normal state i.e., reflection power data of the immersion object obtained in a state that neither trespasser nor immersion object exists within the detection area and intensity of reflection power of objects to be detected in immersion thereof. These data are set based on an initial value which are actually measured in a normal state and a state in which an object to be detected is placed within the detection area. Here, the data stored here may be data which have been subjected to power correction depending on distances or may be data which have not been subjected to power correction depending on distances. In the case that the data which have been subjected to power correction depending on distances are stored, upon obtaining the initial value, the correction operation is carried out on the initial value in the operation processing unit 11, and the resulting value is stored therein.

Here, in the case that the millimeter wave is irradiated to any object, and the object reflects the irradiated millimeter wave, the reflectance differs depending on the material, shape, etc. of the object. Therefore, in the case that, during a warning state, any object is detected, its electric power value is compared with data of an object to be detected, e.g., data of the human body, which has been stored in the storage unit 12 as the initial value, so that, if the two values differ greatly, it is possible to determine that the detected object is not a human body. Therefore, it is possible to reduce erroneous detection cases in which any object not to be detected in its immersion is detected and an alarm is given thereto.

As described above, in the present embodiment, a millimeter-wave radar is used as the crime prevention sensor. Since an electric wave such as a millimeter wave has the property of passing through objects, the method is less susceptible to adverse effects to detection, such as bad visibility due to rain, fog, snow, etc., and bad visibility due to smoke pot used by a dubious character so as to intervene detection, and even under such conditions, it is possible to accurately detect any trespasser, and it is also possible to provide a wider detection target area (e.g., approximately 100 m).

Moreover, in the case of the application of the electric wave, even when dusts, etc. adhere to the reflection member, the effects thereof exerted when the reflected wave from the reflection member is detected by the radar unit 1 are so small that no problems are raised in practical use. Thus, it is possible to eliminate the maintenance of the reflection members.

Here, the above-mentioned power correction depending on distances will be described. In the above-mentioned crime prevention sensor, it has been generally known that the power intensity of a reflected wave to be detected decreases in inversely proportional to the distance raised to the fourth power. Therefore, by correcting the electric power intensity of the reflected wave to be detected so as to make it inversely proportional to the distance to reflection object raised to the fourth power, it is possible to eliminate deviations in power due to distances. Consequently, by carrying out such a power correction, it becomes possible to compare electric powers between reflection objects having different distances. More specifically, an object to be detected in its immersion is placed at an optional position and the initial value is measured, and the above-mentioned electric power correction is carried out with respect to this value. Thus, in the case when during a warning state, reflected waves are detected from any object to be detected in its immersion, the electric power correction is carried out on the reflected wave in the same manner. Thus, wherever the object may exist, the two objects have virtually the same level of values.

However, in general, a human body has a low reflectance to the millimeter electric wave. In other words, in the case that a human body to be detected in its immersion is far away from the sensor main body, the intensity of the reflected wave from the human body decreases extremely. On the other hand, the above-mentioned beat wave includes noise derived from a thermal noise in a circuit for generating a transmission wave and a receiving circuit thereof, a noise generated in a mixer in which the reflected wave and the transmission wave are mixed and a noise component contained in the transmission wave. Therefore, when the human body to be detected is far away from the radar unit 1 beyond a predetermined distance, the intensity of reflected wave from the human body is lowered to the same level as the intensity of the above-mentioned noise component, or to a level smaller than the above-mentioned level, so that the detection of the human body is no longer carried out.

Figure 3:
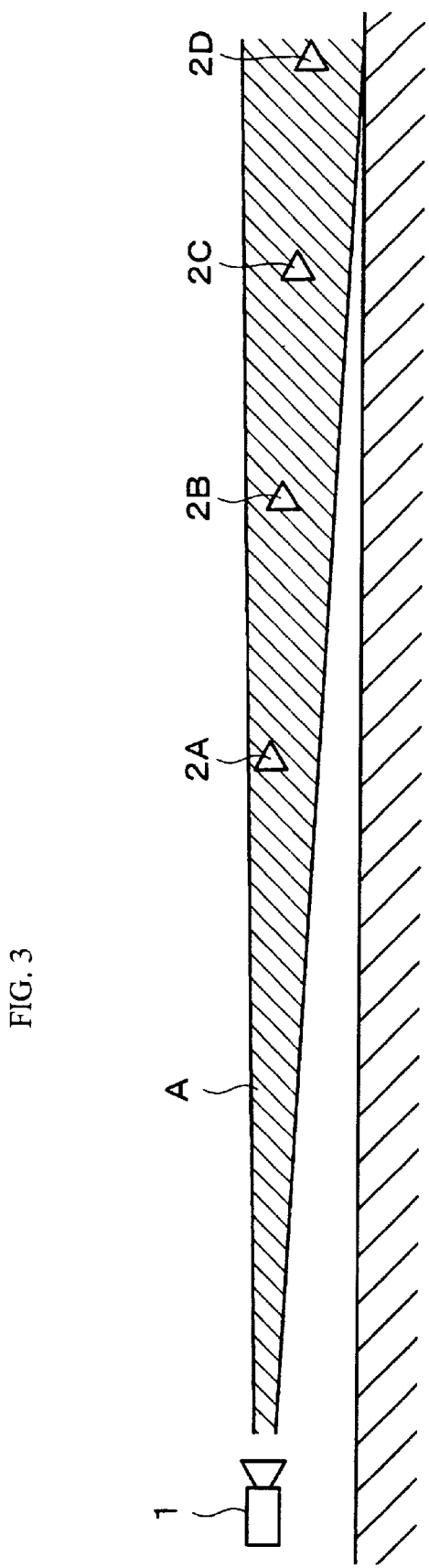
FIG. 3 is a schematic view showing an installation state of a radar and a group of reflection members viewed in the direction of the side face.

Therefore, in the present embodiment, a group of reflection members 2 having a high reflectance to the millimeter wave are placed at positions apart from the radar unit 1 beyond a predetermined distance with predetermined intervals. Thus, this constitution makes it possible to detect any trespasser at a position having a long distance from the radar unit 1. FIG. 3 schematically shows a state that the radar unit 1 and the group of reflection members 2 are placed, viewed in the side face direction. As shown in this Figure, the group of reflection members are placed in this order from the radar unit 1, reflection member 2A, 2B, 2C, 2D, . . . , and they are placed within an electric wave application area A by the radar unit 1.

The reflection member 2A placed at the position closest to the radar unit 1 is positioned with such a distance that the intensity of the reflected wave from an object to be detected, e.g., a human body, is set to the same level as the intensity of the noise component. Then, the next reflection member 2B and thereafter are placed so as to have predetermined intervals from the adjacent reflection members, e.g., the same intervals from each other.

Figure 4:
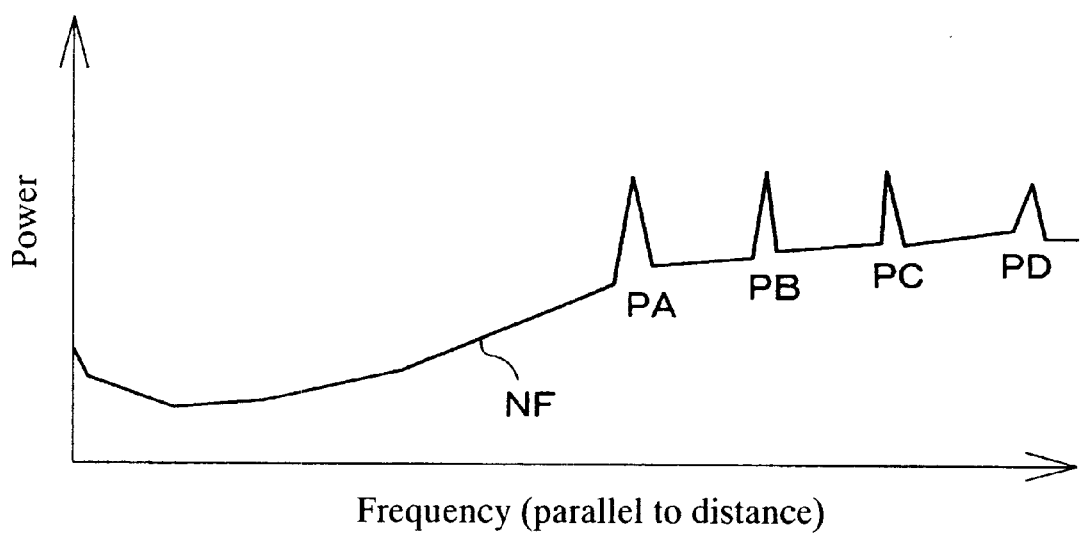
FIG. 4 is a graph showing spectrum data in a normal state i.e., a state in which no immersion object exists within a detection area.

FIG. 4 is a graph showing spectrum data in a normal state, i.e., a state in which no immersion object exists within a detection area in the crime prevention sensor shown in FIG. 3. This graph shows data which have been subjected to the electric power correction depending on distances. In this Figure, a curve indicated by NF represents a noise floor, and since the electric power correction depending on distances have been carried out thereon, it shows a state in which as the distance becomes longer, the noise floor goes higher.

Pieces of data derived from reflections from the reflection members 2A, 2B, 2C, 2D . . . correspond to peaks shown in PA, PB, PC, PD . . . in FIG. 4. In this manner, since each of the reflection members 2A, 2B, 2C, 2D . . . are allowed to have a high reflectance to the millimeter wave so that even when the distance from the radar unit 1 becomes farther, it is possible to obtain a higher electric power value than the noise level.

Next, with respect to the crime prevention sensor shown in FIG. 3, an explanation will be given of a case in which a human body which is an object to be detected in its immersion has invaded to a position closer to the radar unit 1 than to the reflection member 2A. FIG. 5A is a graph showing spectrum data in this case, and FIG. 5B schematically shows a state in which this case is viewed in the side face direction. In FIG. 5A, a peak indicated by PI represents data derived from reflections from a human body. In this manner, in the case that the human body exists in a position closer to the radar unit 1 than to the reflection member 2A, data derived from reflections from the human body have an electric power value higher than the noise level, thereby making it possible to accurately detect the human body. Here, since the reflection members 2A, 2B, 2C, 2D . . . are shielded by the human body in this state, no data derived from reflections appears on the graph.

Next, an explanation will be given of a case in which in the crime prevention sensor shown in FIG. 3, a human body as an object to be detected in its immersion has invaded to a position farther from the radar unit 1 than from the reflection member 2A. FIG. 6A is a graph showing 4 spectrum data in a case that a human body has invaded into a position between the reflection member 2A and the reflection member 2B, and FIG. 6B schematically shows a state that this case is viewed in the side face direction. In FIG. 6A, no data derived from the reflection from the human body appear in the spectrum data. This is because since the human body exists far away from the radar unit 1, data derived from the reflection from the human body have a voltage value which is smaller than the noise level, and are hidden behind the noise.

However, observation on data derived from the reflection from the reflection members shows that although PA representing data derived from the reflection from the reflection member 2A has been detected, data derived from the reflection from the reflection member 2B and thereafter have not been detected. In other words, this shows that the reflections from the reflection members 2B and thereafter are shielded by any object so that any object has invaded between the reflection member 2A and the reflection member 2B.

In this manner, in the case that an object to be detected in its immersion exists at a position farther than the reflection member 2A, by detecting where the object exists, that is, between which reflection members the object exists, based on the resulting spectrum data, it is possible to confirm the range of distances in which the object exists.

As described above, the crime prevention system according to the present embodiment carries out detection of an object by detecting the directly reflected wave from the object, which is so-called reflection-type detection, in the case that the object to be detected in immersion of a human body exists within a predetermined distance from the radar unit 1. Furthermore, in the case that an object to be detected in its immersion exists farther than the predetermined distance from the radar unit 1, the crime prevention system detects at which position that the reflections from a plurality of reflection members previously placed are shielded by the object, thereby detecting the immersion object and the position thereof. Consequently, it becomes possible to detect any immersion object in a wider range from a short distance to a long distance by using one kind of sensor. Thus, it is possible to reduce the costs to construct the crime prevention sensor as compared with a crime prevention sensor in which, e.g., a plurality of sensors are placed depending on distances.

Here, in the present embodiment, as shown in FIG. 6, in the area in which the data derived from the reflection from a human body become smaller than the noise level, i.e., in the area in which an immersion object is closer to the radar unit 1 than to the reflection member 2A, the distance from the radar unit 1 is detected based on the spectrum data obtained from the immersion object, and in the area in which an immersion object is farther than the reflection member 2A, based on spectrum data obtained from the reflection members 2, detection is made as to where the immersion object exists, i.e., between which reflection members the immersion object exists. However, the reflection members 2 may be placed in all the detection target areas, and based on spectrum data obtained from the reflection members 2, detection may be made as to where the immersion object exists, i.e., between which reflection members the immersion object exists.

In this case, the position of the immersion object is not specified accurately, and it is only possible to specify which reflection members have the immersion object located in between. However, since only data obtained from the reflection members 2 having a high reflectance, it is possible to reduce the output of the millimeter wave irradiated from the radar unit 1.

Next, referring to a flow chart shown in FIG. 7, an explanation will be given of the flow of processes in the above-mentioned crime prevention system. When the crime prevention system is activated, it is determined as to whether or not reflection power data of reflection members in a normal state have been stored in the storage unit 12 at step 1 (hereinafter, referred to as S1). If NO at S1, i.e., if no reflection power data about reflection members in a normal state is stored, a process of (a) which will be described later, i.e., data acquiring process in a normal state, is carried out.

In contrast, if YES at S1, i.e., if reflection power data about reflection members in a normal state have been stored, and then, at S2, it is determined as to whether or not reflection power data of an object to be detected in its immersion, such as a human body, have been stored in the storage unit 12. If NO at S2, i.e., if no reflection power data of an object to be detected in its immersion has been stored, a process of (c) which will be described later, i.e., a data acquiring process for an object to be detected in its immersion is carried out.

Here, if YES at S2, i.e., if reflection power data about an object to be detected in its immersion has been stored, and then, at S3, a data acquiring process by the radar unit 1 is carried out, i.e., the millimeter wave is irradiated to the detection area, while detecting the reflected wave to generate a beat wave, and spectrum data are generated from the beat wave. Then, at S4, it is determined as to whether or not the averaging process of the generated spectrum data has been completed.

The averaging process described here is a process for obtaining a value by averaging the spectrum data using a predetermined time or integrating the spectrum data using a predetermined time. In general, data to be instantaneously obtained have variations depending on the states of an object such as moving state and oriented state. Thus, it is possible to stabilize the data by carrying out such an averaging process.

If NO at S4, i.e., if the averaging process has not been completed, the processes are repeated from S3, and if YES at S4, i.e., the averaging process has been completed, and then, at S5, a power correction process is carried out on the spectrum data based on distances.

Then, by extracting peak information in the spectrum data that have been subjected to the power correction process, it is possible to carry out determining processes at S6 and S7 as described below. With respect to the extraction method of the peak information, the following methods may be proposed: a method in which a threshold value is gradually lowered to a predetermined level, and a plurality of pieces of peak information extracted on the way are obtained, and a method in which a plurality of swells of power are extracted by using a predetermined threshold value, and the maximum value in each swell is extracted as peak information.

Based on the peak information extracted as described above, at S6, first, it is determined whether or not there is any immersion object in an area closer to the radar unit 1 than the reflection member 2A which is closest to the radar unit 1. If YES at S6, i.e., if any immersion object has been detected in the closer area, processes from S10, which will be described later, are carried out.

In contrast, if NO at S6, i.e., if it is determined that there is no immersion object in the closer area, and then, it is determined at S7 whether or not all the data derived from the reflections from the reflection members 2A, 2B, 2C, 2D . . . have been detected. If YES at S7, i.e., if all the data derived from reflections from the reflection members 2A, 2B, 2C, 2D . . . have been detected, it is determined that no immersion object exists within the detection area, and by repeating the processes from S3, a warning state is maintained.

If YES at S7, i.e., if it is determined that there is any undetectable reflection member, the undetectable reflection member is specified at S8. Then, at S9, it is determined that any immersion object exists in an area between the closest reflection member to the radar unit 1 of the reflection members which cannot detect and the farthest reflection member from the radar unit 1 of the reflection members which can detect.

Suppose that, e.g., reflection members 2A, 2B, 2C, 2D . . . are placed every 10 meters in an area ranging from 50 m to 100 m away from the radar unit 1. In this state, if the reflection member placed at the point having a distance of 60 m from the radar unit 1 is detected while those reflection members placed at the point having a distance of 70 m and thereafter from the radar unit 1 are not detected and then, it is determined that any immersion object exists within an area from 60 to 70 im away from the radar unit 1.

Thereafter, in the case that at S6, it is determined that any immersion object exists in a short distance, or in the case that at S9, the distance of the immersion object from the radar unit 1 is estimated, the warning device is activated in accordance with the distance of the immersion object from the radar unit 1 at S10, and the corresponding information is given to the manager of the crime prevention system or the guard at S11. Here, with respect to the activation of the warning device and with respect to the determination as to whether or not the corresponding information is given to the manager or the guard, an arrangement may be made so that, whenever any immersion object is detected, an audible alarm and the corresponding information are always given irrespective of the distance from the radar unit 1, or another arrangement may be made so that an audible alarm and the corresponding information are given only when the distance from the radar unit 1 is not more than a predetermined value.

Upon completion of processes in S10 and S11, the processes from S3 are again repeated so that the warning state is maintained. Here, the stop of the operation of the above-mentioned crime prevention system may be manually made by the manager or the guard, or may be automatically made after a lapse of a predetermined period of time.

Next, referred to a flow chart shown in FIG. 8, an explanation will be given of a process indicated by (a) which is carried out when at S1 in the flowchart shown in FIG. 7, a determination is made as YES, i.e., an acquiring process of reflection power data from each reflection member in a normal state (hereinafter, referred to as a first initial setting process). In this first initial setting process, the positions of reflection members that are normally placed within the detection area and the reflection power intensities thereof are recognized, and no operations are carried out as the crime prevention sensor. Here, during the first initial setting process, no object other than the reflection members that are normally placed, are not allowed to enter the detection area.

First, at S21, a reflection power data acquiring process from each reflection member is carried out by the process of the radar unit 1. Then, at S22, it is determined whether or not the process at S21 has been carried out for a predetermined time, and if the predetermined time has not elapsed, the process at S21 is continued. In this manner, by carrying out the reflection power data acquiring process from each reflection member for a predetermined time, the resulting data are averaged so that stable data are obtained. Here, this predetermined time may be set from several seconds to several minutes.

From the data thus acquired, the positions of the reflection members that are normally placed and the reflection power intensities are analyzed. In this case, a method is proposed in which the threshold value of power intensity is gradually lowered with respect to the resulting spectrum data, and at the point of time when all the peak values derived from the reflection members placed within the detection area have been detected, these are set as the reflection power data of the reflection members. Then, the positions of the reflection members and the reflection power intensities thus obtained are stored in the storage unit 12 (S23). At this time, with respect to the reflection power data, it is preferable to carry out power correction depending on distances by using the operation processing unit 11.

Figure 7:
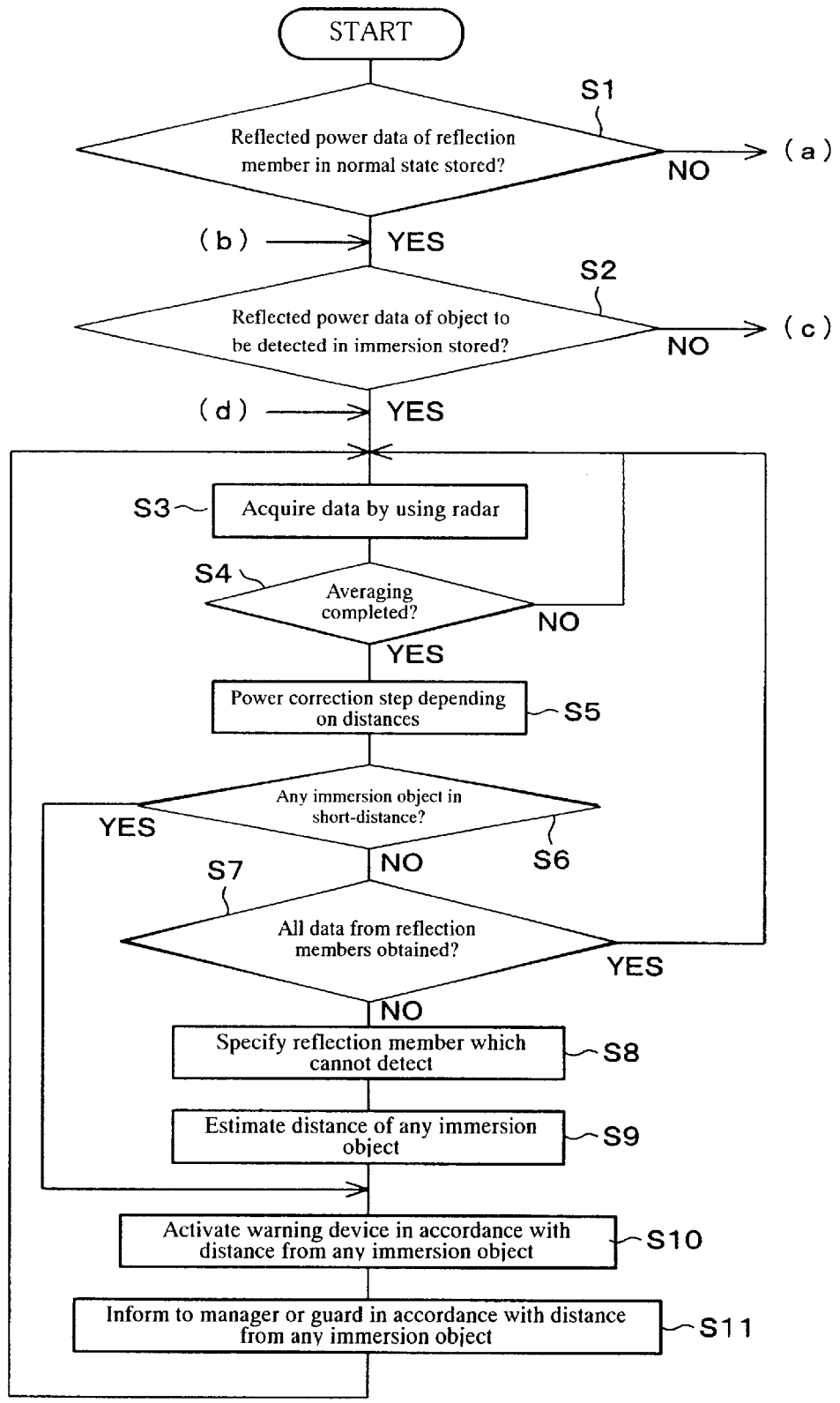
FIG. 7 is a flow chart showing the flow of processes in the above-mentioned crime prevention system.
Figure 8:
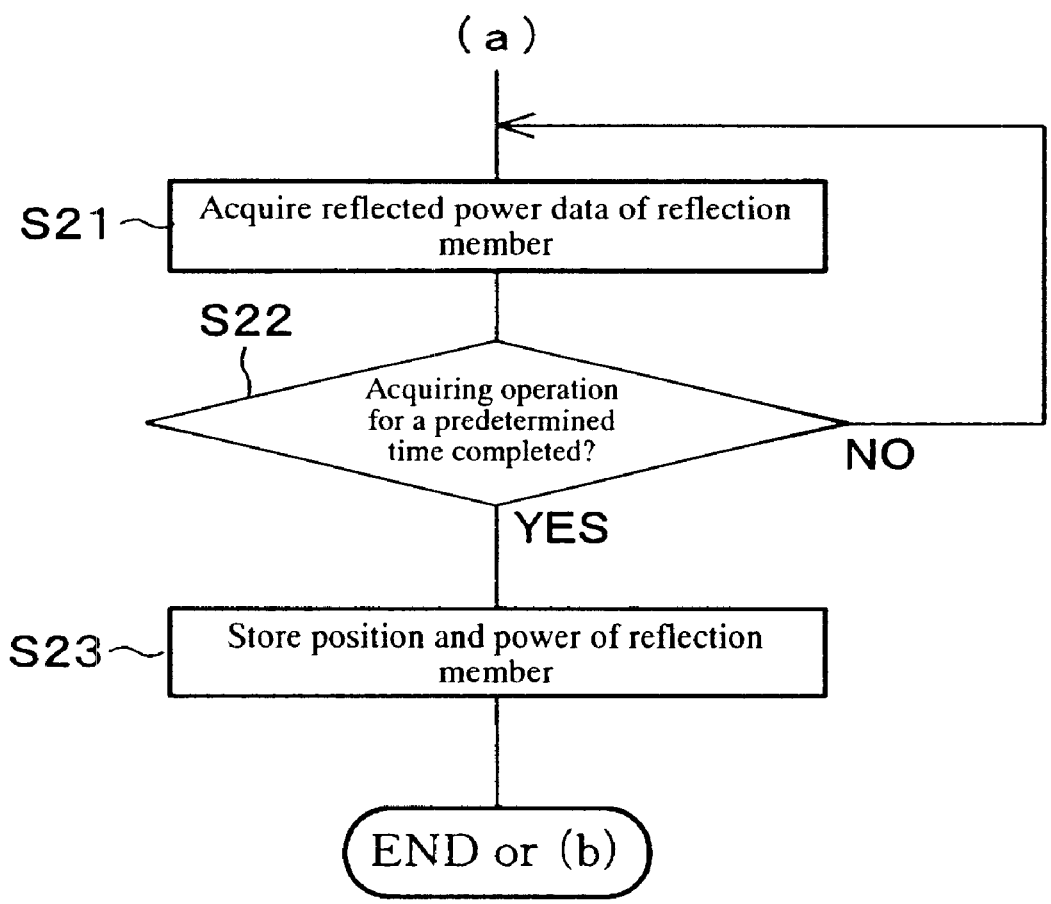
FIG. 8 is a flow chart showing the flow of an acquiring process (a first initial setting process) of reflection power data of a reflection member in the normal state.

As described above, the first initial setting process is completed, and in the case when the processes shown in FIG. 7 are successively carried out, the processes from S2 are continued.

Figure 9:
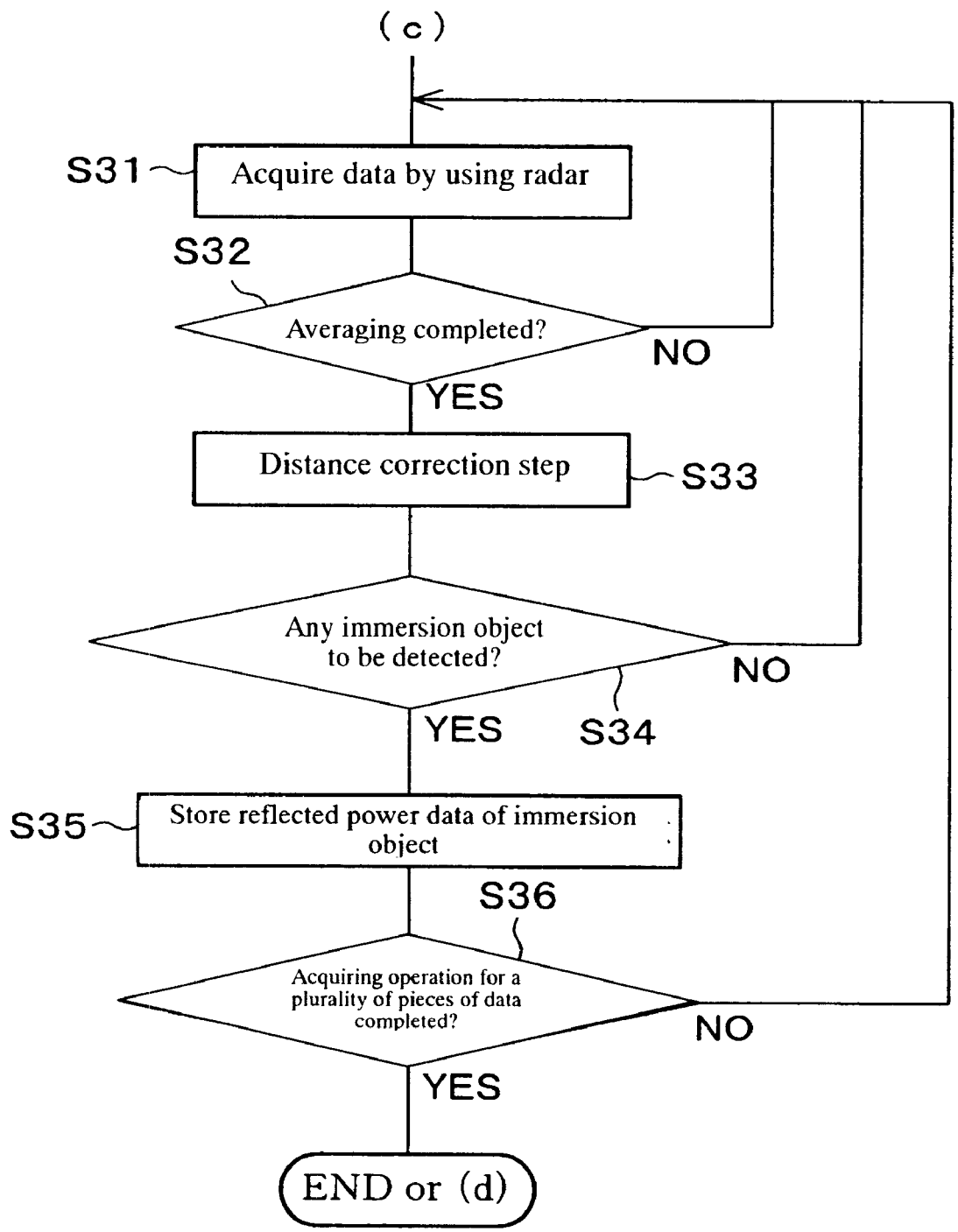
FIG. 9 is a flow chart showing the flow of an acquiring process (a second initial setting process) of reflection power data of an object to be detected in its immersion.
Figure 15:
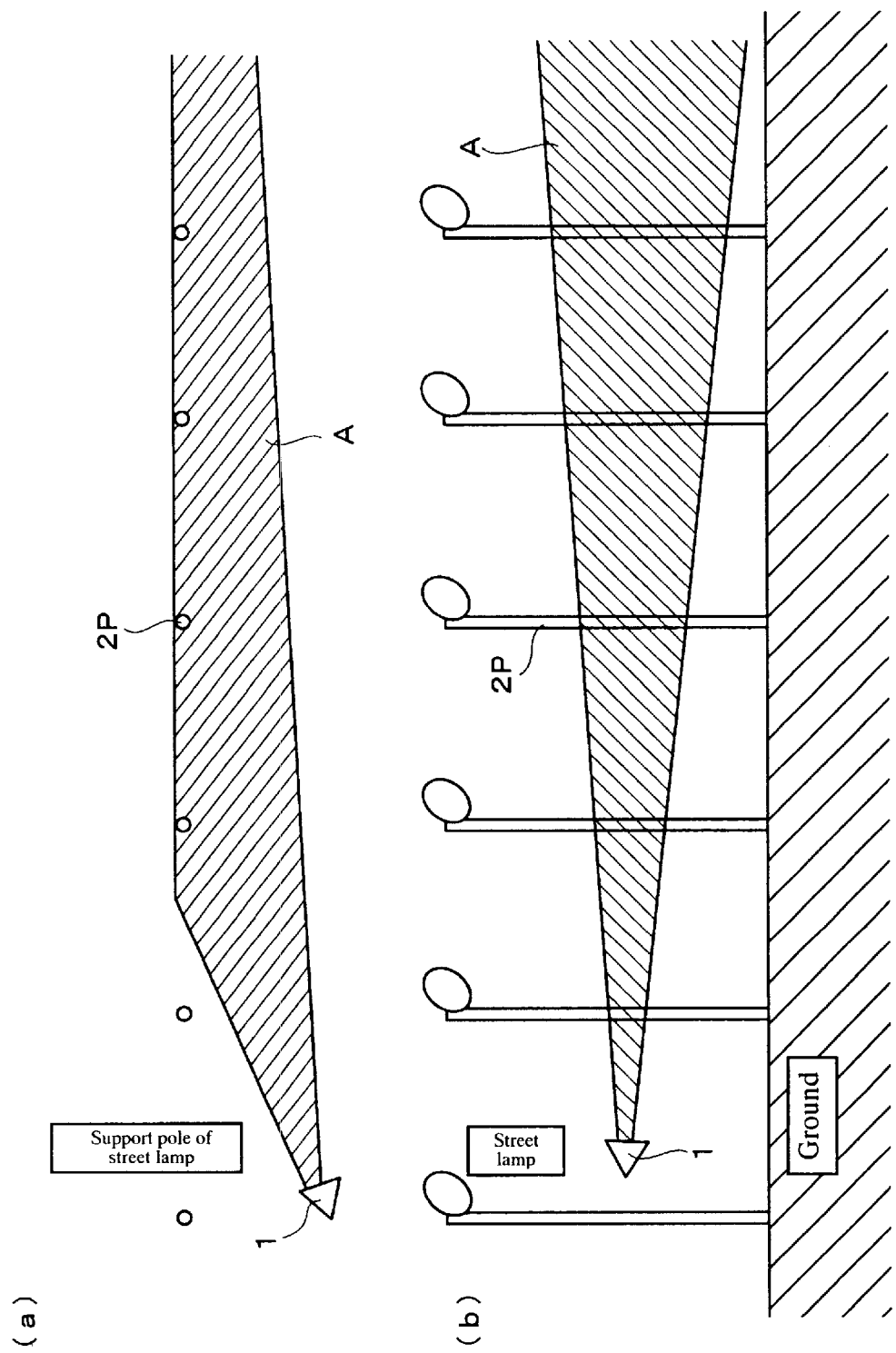
FIG. 15A is a plan view in which the radar and the reflection members in a sixth installation example are viewed from above.
FIG. 15B is a side view in which these members are viewed laterally.
Figure 17:
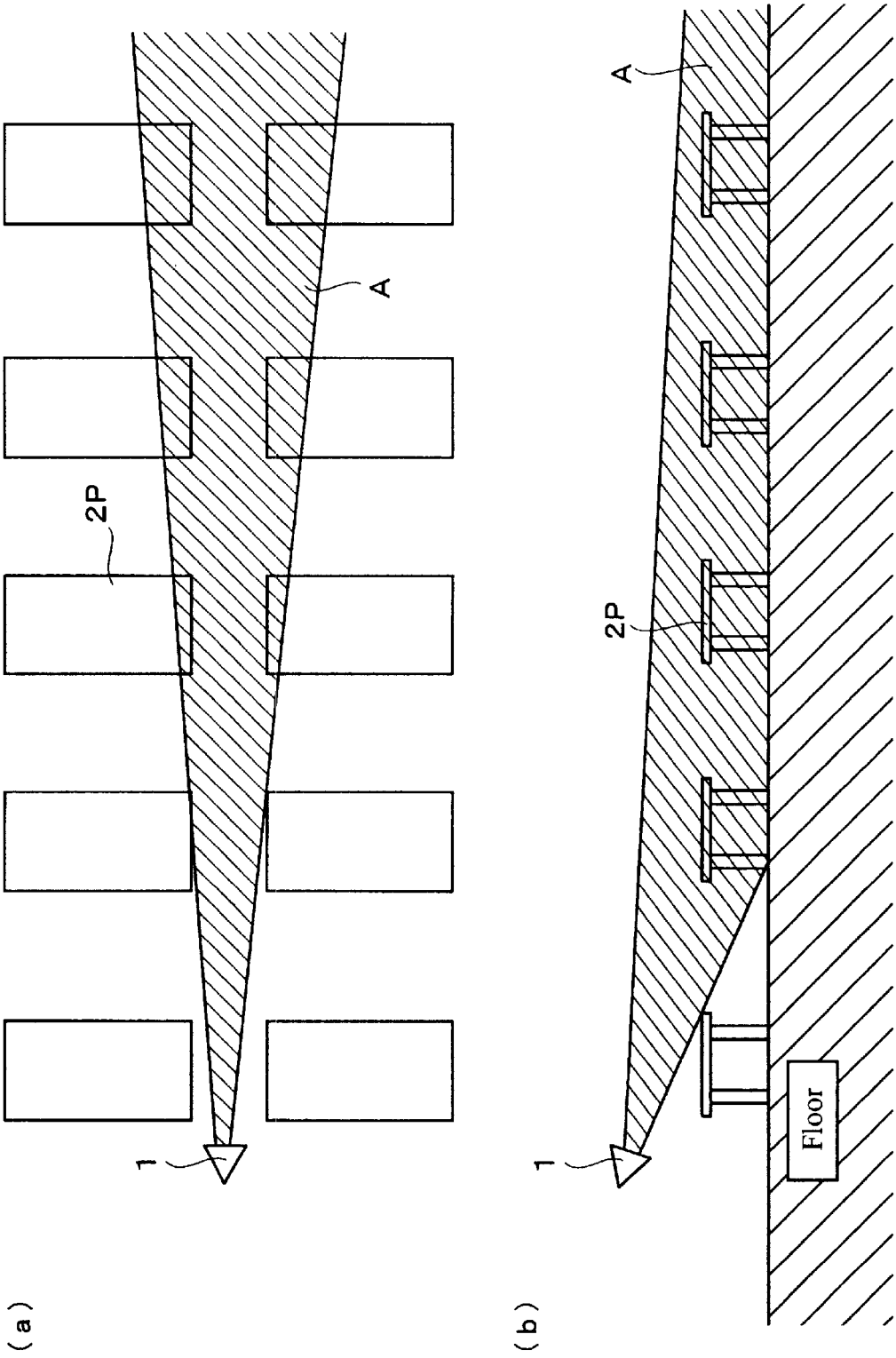
FIG. 17A is a plan view in which the radar and the reflection members in a eighth installation example are viewed from above.
FIG. 17B is a side view in which these members are viewed laterally.

Next, referring to a flow chart shown in FIG. 9, an explanation will be given of the process indicated by (c) in which a determination is made as NO at S2 in the flow chart shown in FIG. 7, i.e., reflection power data acquiring process (hereinafter, referred to as a second initial setting process) for an object to be detected in its immersion. In this second initial setting process, the reflection power of an object to be detected in its immersion is recognized, and no processes are carried out as the crime prevention sensor.

First, upon start of the second initial setting process, an object to be detected in its immersion is allowed to invade in the detection area. Then, at S31, a data acquiring process by the radar unit 1, i.e., a process for irradiating the millimeter wave to the detection area to generate the beat wave by detecting the reflected wave and based on the beat wave, spectrum data are generated. Then, at S32, it is determined whether or not the averaging process of the resulting spectrum data has been completed.

In the same manner as the process S4 in FIG. 7, the averaging process described here is a process for obtaining a value by averaging the obtained spectrum data using a predetermined time or integrating the obtained spectrum data using a predetermined time. It becomes possible to stabilize the data by carrying out such an averaging process.

If NO at S32, i.e., if the averaging process has not been completed, the processes from S31 are repeated, and if YES at S32, i.e., if the averaging process has been completed, a power correction process depending on distances is carried out on the resulting spectrum data at S33.

Thereafter, an extracting process of peak information is carried out on the spectrum data that have been subjected to the power correction process, and at S34, it is determined whether or not the reflection power data obtained from extracted peak information is derived from the immersion object to be detected. Here, the processes are carried out as follows. First, when any immersion object has been detected in the detection area based on the spectrum data obtained at S33, the operator is informed of this fact through the display device 4, etc. In this case, the radar unit 1 refrains from making a determination as to whether or not the detected object is an immersion object to be detected, and allows the operator to make a determination as to whether or not the detected object is an immersion object to be detected through the display device. If the detected object is an immersion object to be detected, the operator inputs the intention that "it is an immersion object to be detected" to the radar unit 1 through the setting input device 3.

When the object has been determined to be an immersion object to be detected at S34, the detected reflection power data is stored in the storage unit 12 as reflection power data of the immersion object to be detected. Moreover, it is presumed that deviations in reflection power intensity might occur depending on individual differences in immersion objects to be detected. Therefore, it is preferable to put a plurality immersion objects to be detected within detection areas one by one, and to carry out the same processes. In other words, in this case, after the completion of the process S35, a determination is made as to whether or not data has been obtained with respect to all the plurality of immersion objects to be detected (S36), and in the case that all the data have not been obtained, immersion objects to be detected are switched, and the processes from S31 are repeated. Then, all the data with respect to the immersion objects to be detected have been obtained, the second initial setting process is completed, and in the case that the processes shown in FIG. 7 are successively carried out, the processes from S3 are executed.

Here, in order to reduce erroneous detection or detection failure due to aging in the sensor unit such as an antenna unit 9 in the radar unit 1 or deviations in reflection power depending on seasons (e.g., in the case that an immersion object to be detected is a human body, deviations in reflection power occur depending on thin clothes and heavy clothes), it is preferable to update the data by periodically carrying out the first and second initial setting processes. Moreover, the radar unit 1 may store accumulated operation time, etc., and when this accumulated operation time has exceeded a predetermined value, may be allowed to send a message for requesting the first and second initial setting processes to, e.g., the manager or the guard.

Next, in the case that an object to be detected in its immersion is a human body, if a small animal enters the detection area, this might be erroneously detected as a trespasser, and therefore, a method for reducing this erroneous detection will be described. An Electric wave such as a millimeter wave has a strong linear property, and the wavelength thereof is comparatively small, thereby seldom causing diffractions. Therefore, by forming the antenna 9 into an array shape, it is possible to expand the releasing area of the electric wave, and also to limit the irradiation range of the electric wave to approximately several degrees.

With the irradiation range of the electric wave being limited in this manner, the height in which the radar unit 1 is placed and the height in which the group of reflection members 2 are placed are set to approximately a range from the abdomen to the chest of a human body. This setting makes it possible to prevent small animals such as cats and dogs from entering the irradiation range of the electric wave, and consequently to reduce the erroneous detection.

Here, even when the electric waves are outputted with the irradiation range being limited, the irradiation range is slightly widened has the distance from the radar unit 1 becomes longer, and this might cause the electric wave to be irradiated on small animals. However, at points having long distances from the radar unit 1, detection of any immersion object is carried out by detecting the presence or absence of reflections from the reflection members. Therefore, by placing the group of reflection members 2 at the above-mentioned height, the reflections of the group of reflection members are not shielded by small animals so that it becomes possible to detect only a human body accurately. In this case, when the electric wave is irradiated onto a small animal, the reflected wave from the small animal is detected, while the reflection power from the small animal is so small that no adverse effects are given to the detection of the reflected wave in the radar unit 1.

Moreover, as described above, when the irradiation range of the electric wave is limited, energy is concentrated in one direction so that the antenna gain becomes greater and the detection distance can be widened more farther. The irradiation range of the electric wave may be properly set depending on factors such as presumed detection distances, the output intensity and receiving sensitivity of the electric wave in the radar unit 1 and the size of an object to be detected in its immersion. In the state assumed in the present embodiment, the irradiation range of the electric wave is set to approximately several degrees.

Next, an explanation will be given of constructions of individual reflection members which constitute the group of reflection members. With respect to the reflection members, any material may be used as long as it has a comparatively high reflectance to electric waves, and preferable examples include metal objects. Moreover, in the case that the reflection members are newly placed within the detection area, it is preferable to set the individual members to have small sizes. Consequently, the small sizes allow easy installation, and make the reflection members less conspicuous from outside. Moreover, these reflection members may be made of materials having an electric wave transmitting property, and may be placed in an embedded state inside a wall or the ground. Thus, it becomes possible to hide the reflection members from outside.

Examples of materials having a high reflectance to the electric wave include a metal reflection material referred to as corner reflector. This corner reflector has a shape of regular tetrahedron, and has a higher reflectance as compared with reflectors having a shape such as a spherical shape, a column shape or a flat plate shape, and this is preferably used for the present preferred embodiment. However, depending on conditions such as installation places, reflectors having an optimal shape may be used on demand.

Next, installation examples of the radar unit 1 and the reflection members 2A, 2B, 2C . . . will be described. FIG. 10A is a plan view showing a first installation example viewed from above, and FIG. 10B is a side view seen laterally. In the first installation example, the reflection members 2A, 2B, 2C . . . are buried in the ground. Since the electric wave such as the millimeter wave irradiated from the radar 1 has a property passing through objects, reflections from these reflection members 2A, 2B, 2C. . . can be detected by the radar unit 1 by properly adjusting the materials constituting the reflection members 2A, 2B, 2C . . . , and the depths to which these are buried.

In this manner, in accordance with the first installation example, since the reflection members 2A, 2B, 2C . . . are buried into the ground, it cannot be seen from outside that these reflection members are installed. Therefore, it becomes possible to provide a crime prevention system without causing adverse effects on the scenery.

FIG. 11A is a plan view showing a second installation example viewed from above, and FIG. 11B is a side view seen laterally. In the second installation example, the reflection members 2A, 2B, 2C . . . are buried into a wall. As described above, since the electric wave such as the millimeter wave irradiated from the radar 1 has a property passing through objects, reflections from these reflection members 2A, 2B, 2C . . . can be detected by the radar unit 1 by properly adjusting the materials constituting the reflection members 2A, 2B, 2C . . . , and the depths to which these are buried.

In this manner, in accordance with the second installation example, since the reflection members 2A, 2B, 2C . . . are buried into a wall, it cannot be seen from outside that these reflection members are installed. Therefore, it becomes possible to provide a crime prevention system without causing adverse effects on the scenery.

Moreover, in accordance with the first and second installation examples, this system may be used as a sensor system for detecting movement of objects in production lines, etc. in a factory.

FIG. 12A is a plan view showing a third installation example viewed from above, and FIG. 12B is a side view seen laterally. In the third installation example, a group of protruding anti-slipping objects, previously installed on a road, are set as reflection members 2P . . . When the group of anti-slipping protruding objects are made of metal, these can be sufficiently used as the reflection members.

Here, in the above-mentioned constitution, the group of anti-slipping protruding objects on a road are set as the reflection members 2P . . . , while the present invention is not intended to be limited thereto, and any objects on the road or previously placed inside the road near its surface may be used as the reflection members 2P . . . , as long as these are objects having a comparatively high reflectance to the electric wave. Examples of these objects include, e.g., lids of grooves, lids of manholes, pipes shallowly buried into the ground, etc.

FIG. 13A is a plan view showing a fourth installation example viewed from above, and FIG. 13B is a side view seen laterally. In the fourth installation example, on a wall face in a building, etc., metal objects, previously placed on the wall face such as sashes of windows, sashes of doors, handles of doors, light bulbs and ornaments thereon, may be set as reflection members 2P . . .

FIG. 14A is a plan view showing a fifth installation example viewed from above, and FIG. 14B is a side view thereof seen laterally. In the fifth installation example, a row of frames made of metal, placed in a fence, are set as reflection members 2P . . .

FIG. 15A is a plan view showing a sixth installation example viewed from above, and FIG. 15B is a side view thereof seen laterally. In the sixth installation example, a row of support poles of street lamps, made of metal, are set as reflection members 2P . . .

FIG. 16A is a plan view showing a seventh installation example viewed from above, and FIG. 16B is a side view thereof seen laterally. In the seventh installation example, on a side wall of a corridor, metal objects, previously placed on the side wall, such as sashes of doors and handles of doors, are set as reflection members 2P . . .

FIG. 17A is a plan view showing an eighth installation example viewed from above, and FIG. 17B is a side view thereof seen laterally. In the eighth installation example, in a conference room or a class room of offices, schools and public organizations, in a state that desks made of metal are placed in parallel with each other, these desks aligned are set as the reflection members 2P . . .

FIG. 18A is a plan view showing a ninth installation example viewed from above, and FIG. 18B is a side view thereof seen laterally. In the ninth installation example, in a conference room, a stadium, a concert hall and a church, in a state that chairs made of metal are placed in parallel with each other, these chairs aligned are set as the reflection members 2P . . .

As described in the third to ninth installation examples, in the case that reflection members, which have been previously placed prior to a state that a crime prevention system is installed, are utilized as the reflection members, by obtaining data in a normal state through the above-mentioned first initial setting process, the reflection objects are allowed to serve as the reflection members used for detecting any immersion object and the distance therefrom.

In this manner, in accordance with the third to ninth installation examples, without the necessity of newly installing reflection members, the objects that have been previously placed are utilized as the reflection members, it is possible to provide a crime prevention system without causing adverse effects on the ambient scenery, and also to reduce the costs required for the preparation of the crime prevention system.

Moreover, in accordance with the third to ninth installation examples, since the flow of people and the state where people are sitting on chairs can be detected, this system can also be used as a sensor system for detecting the state of congestion.

Here, in the present embodiment, a plurality of reflection members 2 are used, while even in the case that only one reflection member is placed in an area in which spectrum data derived from reflections from a human body are hidden under noise level, i.e., in an area farther from the radar unit 1 than reflection member 2A, it is possible to detect at least the fact that any immersion object exists in any position within an area closer than the reflection member among the areas in which the spectrum data are hidden under noise level.

Moreover, in the present embodiment, an explanation has been given of a case in which a millimeter-wave beam is linearly irradiated from the radar unit 1, while, as shown in FIG. 20, a flat face reflection plate 20, which serves as a bending means for bending a beam course (an advancing direction of the millimeter wave), is placed between the radar unit 1 and the reflection member 2. Thus, it is possible to bend the course of the millimeter-wave beam to provide a detection target area having an arrow point shape as shown in FIG. 20A, or to provide a detection target area having a box frame shape as shown in FIG. 20B.

In this case, the detection target area is provided in a non-linear form so that, e.g., even the entire periphery of a building or a winding place having bad visibility may be set as the detection target area. In other words, the single system can be applied to areas having various shapes so that, as compared with cases in which a plurality of systems are placed in respective linear detection areas, it becomes possible to reduce the costs and scale of the system.

Here, in the case that the millimeter wave is utilized, in the same manner as the reflection members 2, the bending means such as a flat face reflection plate 20 may be buried into the building.

Moreover, a plurality of reflection members 2 may be placed so as to have different directions to the radar unit 1. In FIG. 21B and FIG. 22B, two reflection members 2A, 2B are placed on a horizontal face in different directions to the radar unit 1.

In this arrangement, e.g., as shown in FIG. 21B, when an immersion object 30 exists in the direction of the reflection member 2B with respect to the radar unit 1, the radar unit 1 can detect the reflected wave from reflection member 2A, while it cannot detect the reflected wave from reflection member 2B. For this reason, spectrum data of the reflected wave obtained by the radar unit 1 have a power peak PA derived from the reflection member 2A as shown in FIG. 21A.

Thereafter, when the immersion object 30 moves to exist in the direction of the reflection member 2A with respect to the radar unit 1 as shown in FIG. 22B, the radar unit 1 comes to detect the reflected wave from the reflection member 2B, while it cannot detect the reflected wave from the reflection member 2A. For this reason, as shown in FIG. 22A, the spectrum data of the reflected wave obtained by the radar unit 1 comes to have a power peak PB derived from the reflection member 2B.

Therefore, in the case that the spectrum data shown in FIG. 22A is obtained after the spectrum data shown in FIG. 21A has been obtained, the radar unit 1 makes a determination that the immersion object 30 is shifting at least to the right in the horizontal direction (toward the lower side in the drawing). Moreover, in the case that the spectrum data shown in FIG. 21A is obtained after the spectrum data shown in FIG. 22A has been obtained, the radar unit 1 makes a determination that the immersion object 30 is shifting at least to the left in the horizontal direction (toward the upper side in the figure).

[Second Embodiment]

Figure 19:
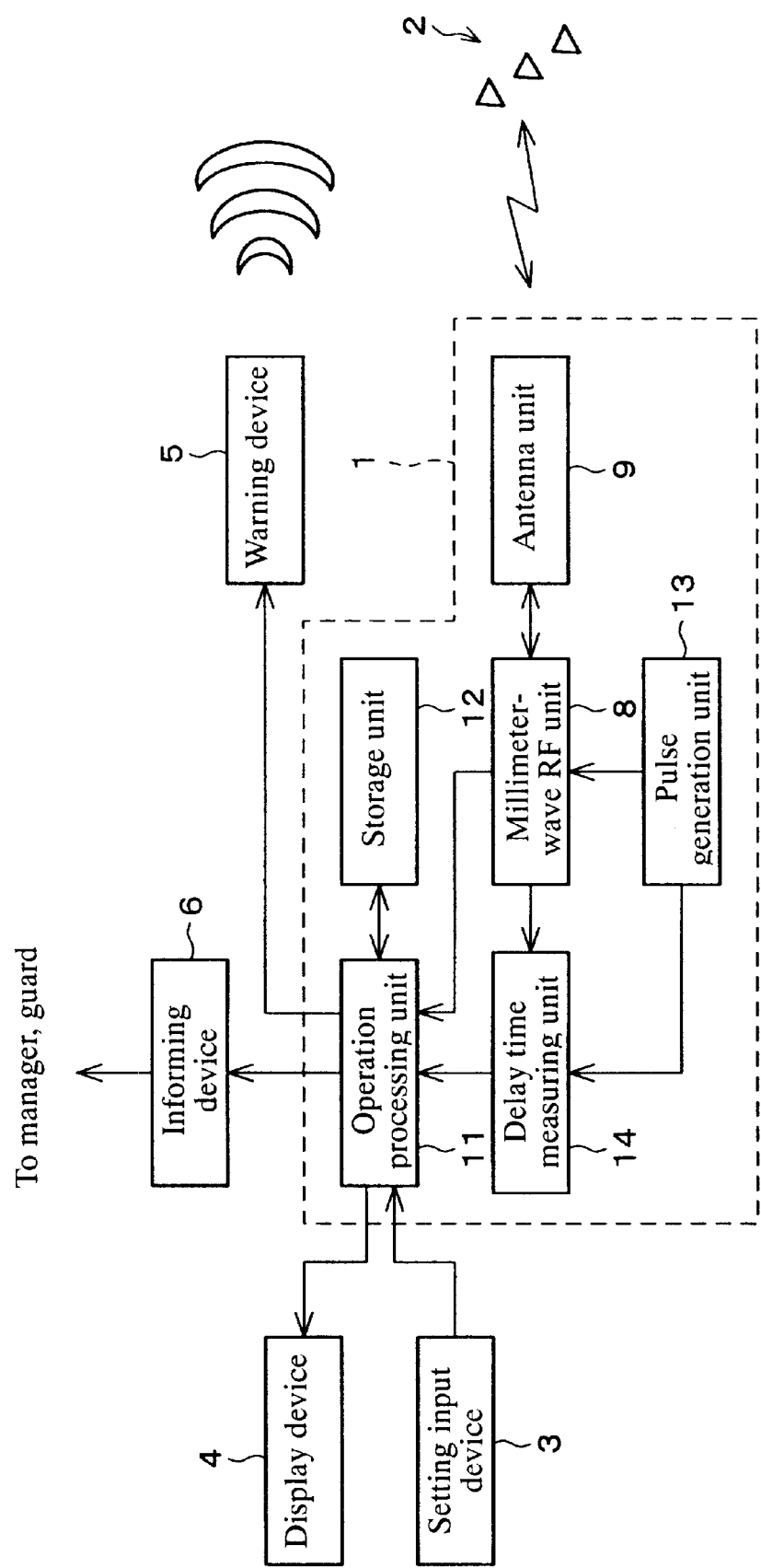
FIG. 19 is a block diagram showing schematic constitution of a crime prevention system in accordance with another embodiment of the present invention.

Referring to FIG. 19, another embodiment of the present invention will be described. Here, those members having the same constructions and functions as those described in the foregoing first embodiment are indicated by the same reference numerals, and the description thereof is omitted.

FIG. 19 shows a schematic construction of a crime prevention system in accordance with the present embodiment. Here, as compared with the construction of the first embodiment described by reference to FIG. 1, this crime prevention system is only distinct in a construction provided in the radar unit 1, and the other constructions such as the group of reflection members 2, the setting input device 3, the display device 4, the warning device 5 and the informing device 6, have the same constructions and therefore, the explanations thereof are omitted.

The radar unit 1 constitutes a pulse system millimeter-wave radar, and as shown in FIG. 19, is provided with a pulse generation unit (a wave applying means) 13, a millimeter-wave RF unit 8, an antenna unit 9, an operation processing unit 11, a delay time measuring unit 14 and a storage unit 12.

The pulse generation unit 13 is a block which controls the presence or absence of the millimeter wave to be externally irradiated through the millimeter-wave RF unit 8 and the antenna unit 9, the amplification intensity and the frequency thereof. Then, in accordance with the control by the pulse generation unit 13, the millimeter-wave RF unit 8 generates the millimeter wave so that the millimeter wave modulated to have a pulse shape is irradiated through the antenna unit 9.

Then, the reflection wave reflected from any object within a detection area is received again by the antenna unit 9, and the millimeter-wave RF unit 8 down-converts the reflected wave into a pulse signal and a received power intensity. The received power intensity is sent to the operation processing unit 11, and the pulse signal is sent to the delay time measuring unit 14.

The delay time measuring unit 14 is a block which compares the times of the pulse signal inputted from the millimeter-wave RF unit 8 and the pulse signal inputted from the pulse generation unit 13 to calculate the distance based on a delay time. The results of this operation are sent to the operation processing unit 11.

In the operation processing unit 11, any immersion object into the detection area is detected based on distance data inputted from the delay time measuring unit 14 and data of received power intensity inputted from the millimeter-wave RF unit 8. In this detection, the inputted received power intensity is compared with the data preliminarily stored in the storage unit 12 so that the object is specified and a determination is made as to whether or not it is an object to be detected in its immersion.

Here, in the case that data stored in the storage unit 12 have not been subjected to power correction depending on distances, this operation processing unit 11 carries out the power correction depending on distances on inputted received power intensity and the data stored in the storage unit 12, and the two pieces of data are compared. Then, depending on the results of detection, actions such as an audible alarm instruction to the warning device 5 and an informing instruction to the informing unit 6 are taken.

The storage unit 12 is a block for storing a normal state, i.e., for storing received power intensity of the reflection member obtained in a state that neither trespasser nor immersion object exists within the detection area and received power intensity of any object to be detected in its immersion. These data are set based on initial values which are actually measured in a normal state and a state in which an object to be detected is placed within the detection area. Here, the data stored here may be data that have been subjected to power correction depending on distances or may be data that have not been subjected to power correction depending on distances. In the case that the data which have been subjected to power correction depending on distances are stored, upon obtaining the initial values, correction operations are carried out on the initial values in the operation processing unit 11, and the resulting values are stored therein.

As described above, the crime prevention system in accordance with the present embodiment is only distinct from the crime prevention system of the first embodiment in the construction of the radar unit 1, and the detection method of an immersion object and the procedure thereof are the same as those of the first embodiment. In other words, the portions in the first embodiment other than the construction of the radar unit 1 are all applicable to the present embodiment.

Moreover, in the above-mentioned embodiments, those units using the electric wave such as the millimeter wave are used as the radar unit 1, while the present invention is not intended to be limited thereto, and e.g., radar using an infrared ray and an ultrasonic wave may be adopted. Here, e.g., even in the case of radars which, different from a detection of an immersion object in a short distance in the present embodiment, cannot detect the distance of the immersion object by detecting the directly reflected wave from an immersion object, it is possible to apply to these radars the system of detection for any immersion object in a long distance in the present embodiments, i.e., a system in which by detecting the reflected wave from a plurality of reflection members, a detection of any immersion object and the estimation of the distance thereof are carried out.

We claim:

1. An immersion object detection method comprising the steps of:

irradiating a wave to a detection target area;

detecting a reflected wave from the detection target area by reflected wave detection means; and determining that an immersion object exists within the detection target area in a case that the reflected wave cannot be detected from at least one reflection member among a plurality of reflection members placed within the detection target area, and simultaneously specifying a position of the immersion object in accordance with a position of the reflection member which cannot detect.

2. The immersion object detection method according to claim 1, wherein the plurality of reflection members are placed such that distances from the reflected wave detection means to each of the reflection members are different, respectively, and the position of the immersion object is specified as any position between a reflection member having the furthest distance from the reflected wave detection means among the reflection members which can detect the reflected wave and a reflection member having the nearest distance from the reflected wave detection means among the reflection members which cannot detect the reflected wave.

3. The immersion object detection method according to claim 1, wherein the plurality of reflection members are placed such that at least one reflection member among the plurality of reflection members has a different direction with respect to the reflected wave detection means as compared with the other reflection members.

4. The immersion object detection method according to claim 1, wherein in a case that the immersion object exists in a short-distance area having a distance of not more than a predetermined value from the reflected wave detection means, the position of the immersion object is specified by analyzing a directly reflected wave from the immersion object, and in a case that the immersion object exists in a long-distance area having a distance of not less than a predetermined value from the reflected wave detection means, the position of the immersion object is specified in accordance with the position of the reflection member which cannot detect.

5. The immersion object detection method according to claim 1, comprising the steps of:

placing a reference object for comparing with the immersion object in the short-distance area within the detection target area;

irradiating the wave to the detection target area, thereby detecting the reflected wave from the reference object by the reflected wave detection means; and creating reference object information based on the reflected wave to be detected, wherein in the case that the immersion object exists in the short-distance area, the position of the immersion object is specified, and the reference object information is compared with immersion object information created based on the reflected wave from the immersion object detected by the reflected wave detection means, thereby specifying the kind of the immersion object.

6. The immersion object detection method according to claim 1, wherein the wave to be irradiated is an electric wave.

7. The immersion object detection method according to claim 1, comprising the steps of:

irradiating the wave to the detection target area in a state that no immersion object exists within the detection target area, thereby detecting the reflected wave from the reflection member by the reflected wave detection means; and creating normal state information with respect to the reflection member based on the reflected wave to be detected, wherein the reflection member which cannot detect is specified by comparing the normal state information with information created based on the reflected wave detected by the reflected wave detection means.

8. An immersion object detection method comprising the steps of:

irradiating a wave to a detection target area;

detecting a reflected wave from the detection target area by reflected wave detection means;

determining that an immersion object exists within the detection target area in a case that the reflected wave cannot be detected from one reflection member placed within the detection target area, and simultaneously specifying a position of the immersion object in accordance with a position of the reflection member which cannot detect, wherein the position of the immersion object is specified by analyzing a directly reflected wave from the immersion object in a case that the immersion object exists in a short-distance area having a distance of not more than a predetermined value from the reflected wave detection means, while in a case that the immersion object exists in a long-distance area having a distance of not less than the predetermined value from the reflected wave detection means, the reflected wave cannot be detected from the reflection member by the reflected wave detection means, so that existence of the immersion object is specified between a position in which a distance from the reflected wave detection means is the predetermined value and a position where the reflection member is placed.

9. The immersion object detection method according to claim 8, comprising the steps of:

placing a reference object for comparing with the immersion object in the short-distance area within the detection target area;

irradiating the wave to the detection target area, thereby detecting the reflected wave from the reference object by the reflected wave detection means; and creating reference object information based on the reflected wave to be detected, wherein the position of the immersion object is specified in the case that the immersion object exists in the short-distance area, and the kind of the immersion object is specified by comparing the reference object information with immersion object information created based on the reflected wave from the immersion object detected by the reflected wave detection means.

10. The immersion object detection method according to claim 8, wherein the wave to be irradiated is an electric wave.

11. The immersion object detection method according to claim 8, comprising the steps of:

irradiating the wave to the detection target area in a state that no immersion object exists within the detection target area, thereby detecting the reflected wave from the reflection member by the reflected wave detection means; and creating normal state information with respect to the reflection member based on the reflected wave to be detected, wherein the reflection member which cannot detect is specified by comparing the normal state information with information created based on the reflected wave detected by the reflected wave detection means.

12. An immersion object detection method comprising the steps of:

irradiating a wave to a detection target area;

detecting a reflected wave from the detection target area by reflected wave detection means; and determining that an immersion object exists within the detection target area in a case that the reflected wave cannot be detected from one reflection member placed within the detection target area, wherein the wave to be irradiated is an electric wave.

13. The immersion object detection method according to claim 12, comprising the steps of:

irradiating the wave to the detection target area in a state that no immersion object exists within the detection target area, thereby detecting the reflected wave from the reflection member by the reflected wave detection means; and creating normal state information with respect to the reflection member based on the reflected wave to be detected, wherein the reflection member which cannot detect is specified by comparing the normal state information with information created based on the reflected wave detected by the reflected wave detection means.

14. An immersion object detection system comprising:

wave irradiation means of irradiating a wave to a detection target area;

a plurality of reflection members placed within the detection target area;

reflected wave detection means in which the wave irradiated from the wave irradiation means detects a reflected wave from the detection target area; and immersion object detection means of detecting an immersion object within the detection target area, wherein in a case that the reflected wave detection means cannot detect the reflected wave from at least one reflection member among the plurality of reflection members, the immersion object detection means determines that the immersion object exists within the detection target area and specifies a position of the immersion object in accordance with a position of the reflection member which cannot detect.

15. The immersion object detection system according to claim 14, wherein the plurality of reflection members are placed such that distances from the reflected wave detection means to each of the reflection members are different, respectively, and the immersion object detection means determines that the immersion object exists between a reflection member having a furthest distance from the reflected wave detection means among the reflection members which can detect the reflected wave and a reflection member having a nearest distance from the reflected wave detection means among the reflection members which cannot detect the reflected wave.

16. The immersion object detection system according to claim 14, wherein the plurality of reflection members are placed such that at least one reflection member among the plurality of reflection members has a different direction with respect to the reflected wave detection means as compared with the other reflection members.

17. The immersion object detection system according to claim 14, wherein in a case that the immersion object exists in a short-distance area where a distance from the reflected wave detection means is not more than a predetermined value, the immersion object detection means specifies the position of the immersion object by analyzing a directly reflected wave from the immersion object, and in a case that the immersion object exists in a long-distance area where a distance from the reflected wave detection means is not less than the predetermined value, the immersion object detection means specifies the position of the immersion object in accordance with the position of the reflection member which cannot detect.

18. The immersion object detection system according to claim 14, further comprising a storage means of previously placing a reference object for comparing with the immersion object in the short-distance area within the detection target area, thereby storing reference object information of the reflected wave from the reference object detected by the reflected wave detection means, wherein the immersion object detection means compares the reference object information stored in the storage means with information detected by the reflected wave detection means in a case that the immersion object is detected in the short-distance area, thereby specifying the kind of the immersion object.

19. The immersion object detection system according to claim 14, wherein the wave irradiated from the wave irradiation means is an electric wave.

20. The immersion object detection system according to claim 14, further comprising a storage means of storing normal state information of the reflected wave from the reflection member, detected by the reflected wave detection means, in a state that no immersion object exists within the detection target area, wherein the immersion object detection means compares the normal state information stored in the storage means with information detected by the reflected wave detection means, thereby specifying the reflection member which cannot detect.

21. The immersion object detection system according to claim 14, wherein the reflection members are placed within a range of a predetermined height from the ground surface.

22. The immersion object detection system according to claim 14, wherein the reflection members are objects previously placed within the detection target area.

23. The immersion object detection system according to claim 14, wherein a deflection means of deflecting a course of the wave irradiated by the wave irradiation means is provided between the wave irradiation means and the reflection members.

24. A radar device used in the immersion object detection system according to claim 14.

25. A reflection member used in the immersion object detection system according to claim 14.

26. An immersion object detection system comprising:

wave irradiation means of irradiating a wave to a detection target area;

a reflection member placed within the detection target area;

reflected wave detection means in which the wave irradiated from the wave irradiation means detects the reflected wave from the detection target area; and immersion object detection means of detecting the immersion object within the detection target area, wherein in a case that the immersion object exists in a short-distance area where a distance from the reflected wave detection means is not more than a predetermined value, the immersion object detection means specifies a position of the immersion object by analyzing a directly reflected wave from the immersion object, and in a case that the immersion object exists in a long-distance area where a distance from the reflected wave detection means is not less than the predetermined value, the reflected wave detection means cannot detect the reflected wave from the reflection member, so that the immersion object detection means specifies that the immersion object exists between a position in which a distance from the reflected wave detection means is the predetermined value and a position where the reflection member is placed.

27. The immersion object detection system according to claim 26, further comprising a storage means of previously placing a reference object for comparing with the immersion object in the short-distance area within the detection target area, thereby storing reference object information of the reflected wave from the reference object detected by the reflected wave detection means, wherein the immersion object detection means compares the reference object information stored in the storage means with information detected by the reflected wave detection means in a case that the immersion object is detected in the short-distance area, thereby specifying the kind of the immersion object.

28. The immersion object detection system according to claim 26, wherein the wave irradiated from the wave irradiation means is an electric wave.

29. The immersion object detection system according to claim 26, further comprising a storage means of storing normal state information of the reflected wave from the reflection member, detected by the reflected wave detection means, in a state that no immersion object exists within the detection target area, wherein the immersion object detection means compares the normal state information stored in the storage means with information detected by the reflected wave detection means, thereby specifying the reflection member which cannot detect.

30. The immersion object detection system according to claim 26, wherein the reflection members are placed within a range of a predetermined height from the ground surface.

31. The immersion object detection system according to claim 26, wherein the reflection members are objects previously placed within the detection target area.

32. The immersion object detection system according to claim 26, wherein a deflection means of deflecting the a course of the wave irradiated by the wave irradiation means is provided between the wave irradiation means and the reflection members.

33. A radar device used in the immersion object detection system according to claim 26.

34. A reflection member used in the immersion object detection system according to claim 26.

35. An immersion object detection system comprising:

wave irradiation means of irradiating a wave to a detection target area;

a reflection member placed within the detection target area;

reflected wave detection means in which the wave irradiated from the wave irradiation means detects the reflected wave from the detection target area; and immersion object detection means of detecting the immersion object within the detection target area, wherein the wave irradiated from the wave irradiation means is an electric wave, and in a case that the reflected wave detection means cannot detect the reflected wave from the reflection member, the immersion object detection means determines that the immersion object exists within the detection target area, and the immersion object detection means specifies that the immersion object exists between a position of the reflected wave detection means and a position of the reflection member.

36. The immersion object detection system according to claim 35, further comprising a storage means of storing normal state information of the reflected wave from the reflection member, detected by the reflected wave detection means, in a state that no immersion object exists within the detection target area, wherein the immersion object detection means compares the normal state information stored in the storage means with information detected by the reflected wave detection means, thereby specifying the reflection member which cannot detect.

37. The immersion object detection system according to claim 35, wherein the reflection members are placed within a range of a predetermined height from the ground surface.

38. The immersion object detection system according to claim 35, wherein the reflection members are objects previously placed within the detection target area.

39. The immersion object detection system according to claim 35, wherein a deflection means of deflecting a course of the wave irradiated by the wave irradiation means is provided between the wave irradiation means and the reflection members.

40. A radar device used in the immersion object detection system according to claim 35.

41. A reflection member used in the immersion object detection system according to claim 35.

* * * * *